(12) United States Patent
Wu

(10) Patent No.: US 8,965,387 B2
(45) Date of Patent: Feb. 24, 2015

(54) RADIO COMMUNICATION SYSTEM, BASE STATION APPARATUS, TERMINAL APPARATUS, AND RADIO COMMUNICATION METHOD IN RADIO COMMUNICATION SYSTEM

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 13/192,801

(22) Filed: Jul. 28, 2011

(65) Prior Publication Data

US 2011/0281607 A1    Nov. 17, 2011

Related U.S. Application Data

(63) Continuation of application No. PCT/JP2009/000394, filed on Feb. 2, 2009.

(51) Int. Cl.
*H04W 72/00* (2009.01)
*H04B 7/00* (2006.01)
*H04L 5/00* (2006.01)
*H04B 7/04* (2006.01)
*H04W 48/08* (2009.01)
*H04W 72/04* (2009.01)
*H04W 72/12* (2009.01)
*H04W 88/08* (2009.01)

(52) U.S. Cl.
CPC ............. *H04L 5/005* (2013.01); *H04L 5/0023* (2013.01); *H04B 7/0413* (2013.01); *H04W 48/08* (2013.01); *H04W 72/046* (2013.01); *H04W 72/12* (2013.01); *H04W 72/1289* (2013.01); *H04W 88/08* (2013.01)
USPC ........................... 455/450; 455/509; 455/500

(58) Field of Classification Search
USPC .............. 455/500, 114.3, 450, 423, 522, 509; 370/329, 252
See application file for complete search history.

(56) References Cited

U.S. PATENT DOCUMENTS

| 2008/0212701 | A1* | 9/2008 | Pan et al. ....................... 375/260 |
| 2009/0046793 | A1* | 2/2009 | Love et al. ...................... 375/260 |
| 2010/0103867 | A1* | 4/2010 | Kishiyama et al. ........... 370/320 |

(Continued)

OTHER PUBLICATIONS

ETRI; "Common reference signal structure for 8 transmit antennas"; R1-084145; Agenda Item: 11.3 DL transmission scheme; 3GPP TSG RAN WG1 Meeting #55, Prague, Czech Rep., Nov. 10-14, 2008. [Ref.: ISR mailed Apr. 28, 2009].

(Continued)

*Primary Examiner* — Ping Hsieh
*Assistant Examiner* — Xin Jia
(74) *Attorney, Agent, or Firm* — Myers Wolin, LLC

(57) ABSTRACT

A radio communication system including: a base station apparatus; and a terminal apparatus, wherein the base station apparatus includes: five or more transmission antennas; and a processor configure for holdings first scheduling information including a data channel region and a control channel region, and in which each of resources of a common reference signal transmitted from each of the fifth and subsequent transmission antennas is allocated respectively, to be different region from first region to that each of resources of a common reference signal transmitted from each of the transmission antennas up to an m-th antenna (m being an integer that satisfies 1≤m<5) is allocated, to overlap the data channel region to that a data is allocated or the control channel region to that a control signal is allocated, and to be a different region each other.

22 Claims, 24 Drawing Sheets

RADIO COMMUNICATION SYSTEM 10

(56) References Cited

U.S. PATENT DOCUMENTS

| | | | | |
|---|---|---|---|---|
| 2010/0190486 | A1* | 7/2010 | Kimura et al. | 455/423 |
| 2010/0322100 | A1* | 12/2010 | Wan et al. | 370/252 |
| 2011/0103338 | A1* | 5/2011 | Astely et al. | 370/329 |
| 2011/0275392 | A1* | 11/2011 | Haustein et al. | 455/500 |

OTHER PUBLICATIONS

Motorola: "Common Reference Symbol Mapping/Signaling for 8 Transmit Antennas"; Agenda Item: 11; R1-083827; 3GPP TSG RAN #54bis; Prague, Czech Rep. Sep. 28-Oct. 3, 2008. [Ref.: ISR mailed Apr. 28, 2009].

NTT DOCOMO; "Support of DL Higher-Order MIMO Transmission in LTE-Advanced" Agenda Item: 11.3; R1-084251; 3GPP TSG RAN WG1 Meeting #55, Prague, Czech Republic, Nov. 10-14, 2008. [Ref.: ISR mailed Apr. 28, 2009].

LG Electronics: "Downlink Reference Signal for Higher Order MIMO"; Agenda Item: 12.5; R1-090218; 3GPP TSG RAN WG1 Meeting #55bis; Ljubijana, Slovenia, Jan. 12-17, 2009. [Ref.: ISR mailed Apr. 28, 2009].

International Search Report issued for corresponding International Patent Application No. PCT/JP2009/000394, mailed Apr. 28, 2009.

ETSI TS 136 212 V8.5.0; "LTE; Evolved Universal Terrestrial Radio Access (E-UTRA); Multiplexing and channel coding" (3GPP TS 36.212 version 8.5.0 Release 8); Feb. 2009.

ETSI TS 136 213 V8.5.0; "LTE; Evolved Universal Terrestrial Radio Access (E-UTRA); Physical layer procedures" (3GPP TS 36.213 version 8.5.0 Release 8); Feb. 2009.

3GPP TS 36.211 V8.3.0; "3rd Generation Partnership Project; Technical Specification Group Radio Access Network; Evolved Universal Terrestrial Radio Access (E-UTRA); Physical Channels and Modulation" (Release 8); May 2008.

3GPP TR 36.913 V8.0.0; "3rd Generation Partnership Project; Technical Specification Group Radio Access Network; Requirements for Further Advancements for E-UTRA (LTE-Advanced)" (Release 8); Jun. 2008.

Nortel Networks; TSG-RAN1 #54; "RS design considerations for high-order MIMO in LTE-A"; Agenda Item: 12; R1-083157; Aug. 18-22, 2008, Jeju, Korea.

Texas Instruments; "Common Reference Symbol Mapping/Signaling for 8 Transmit Antenna"; Agenda Item: 11.3; R1-084447; 3GPP TSG RAN1 #55, Prague, Czech Republic, Nov. 10-14, 2008.

Motorola; "Common Reference Symbol Mapping/Signaling for 8 Transmit Antennas"; R1-083224; 3GPP TSG RAN1 #54, Jeju, Korea, Aug. 18-22, 2008.

David J. Love et al; "Limited Feedback Unitary Precoding for Spatial Multiplexing Systems"; IEEE Transactions on Information Theory, vol. 51, No. 8, Aug. 2005.

S.W. Golomb et al; "Generalized Barker Sequences" IEEE Transactions on Information Theory, Oct. 1965.

David J. Love et al; "Grassmannian Beamforming for Multiple-Input Multiple-Output Wireless Systems"; IEEE Transactions on Information Theory, vol. 49, No. 10, Oct. 2003.

\* cited by examiner

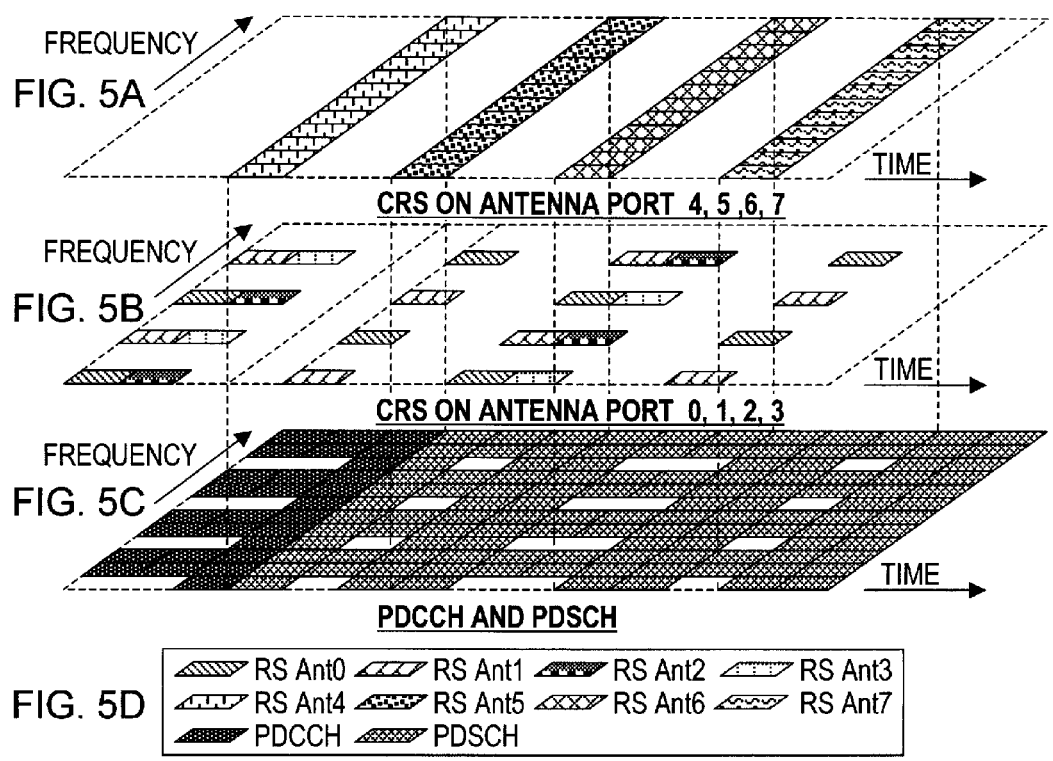

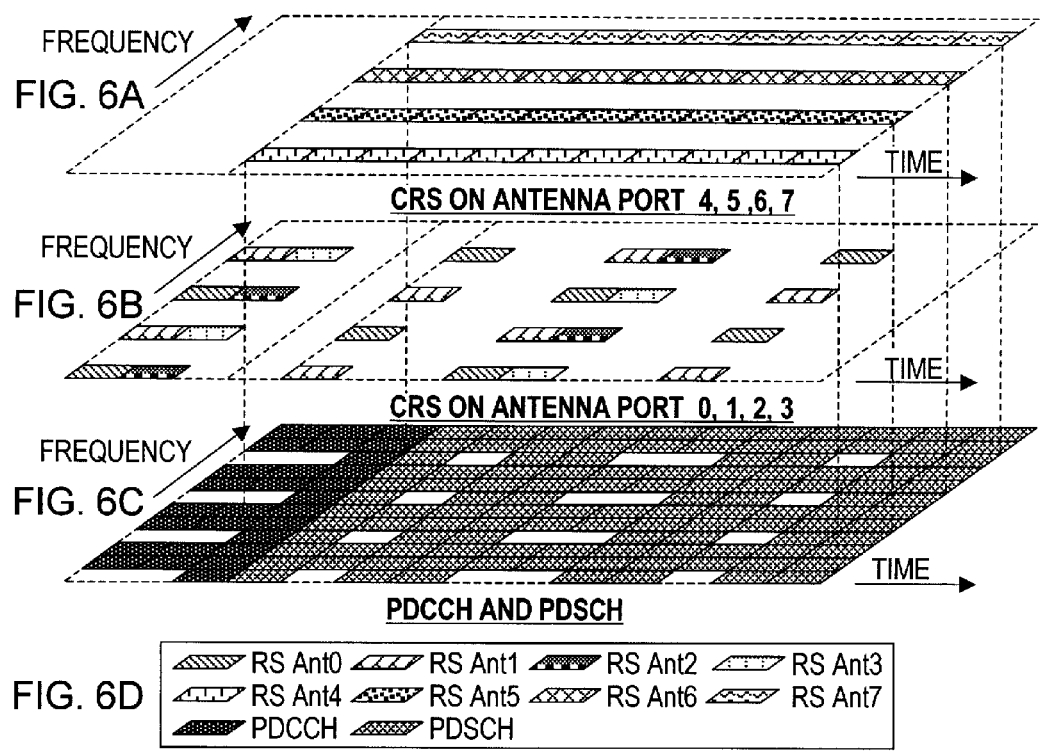

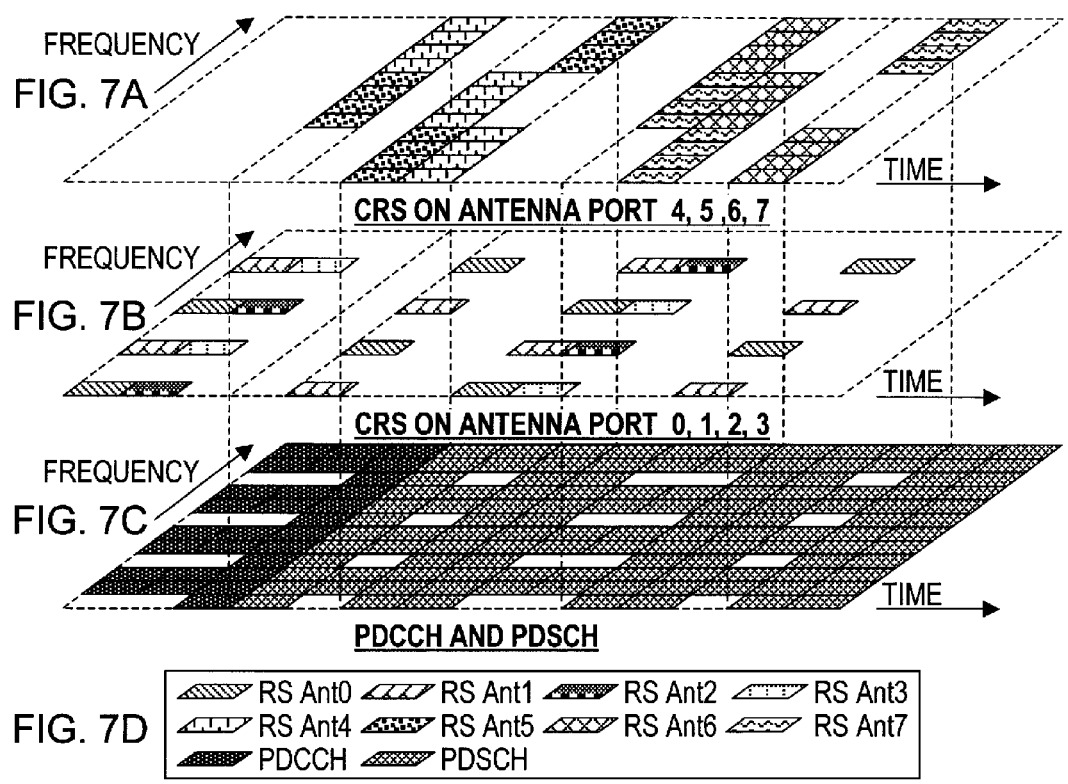

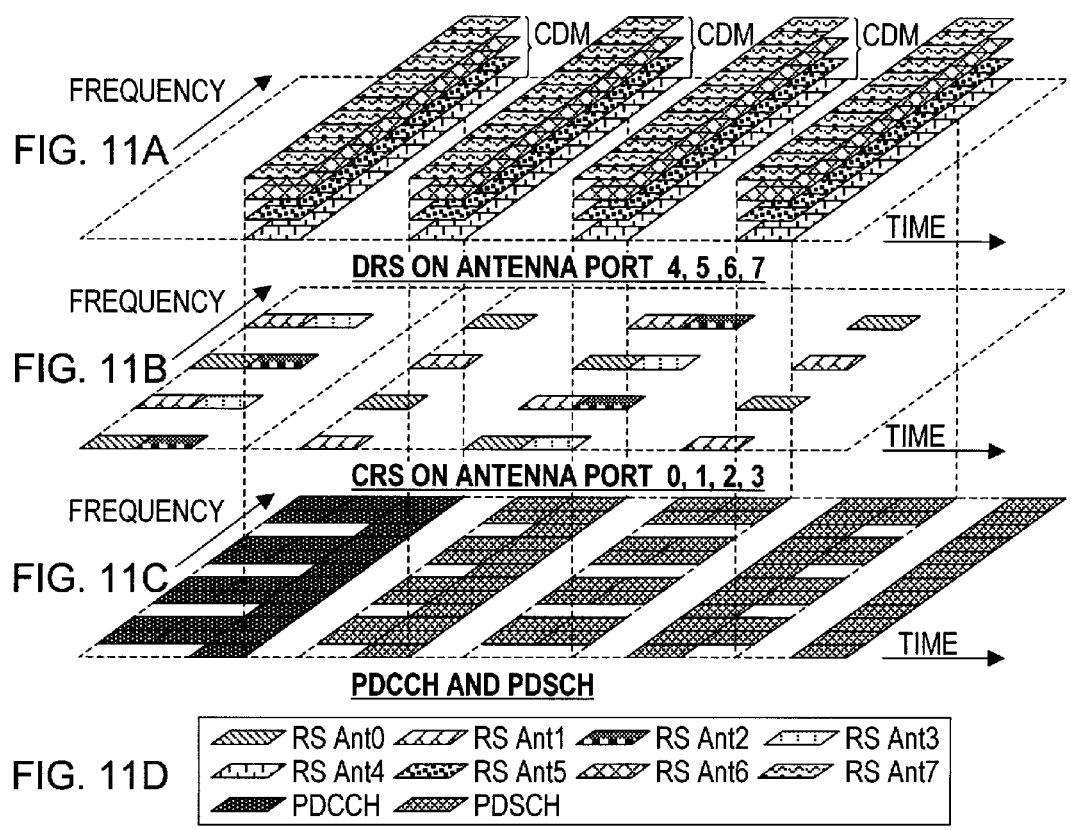

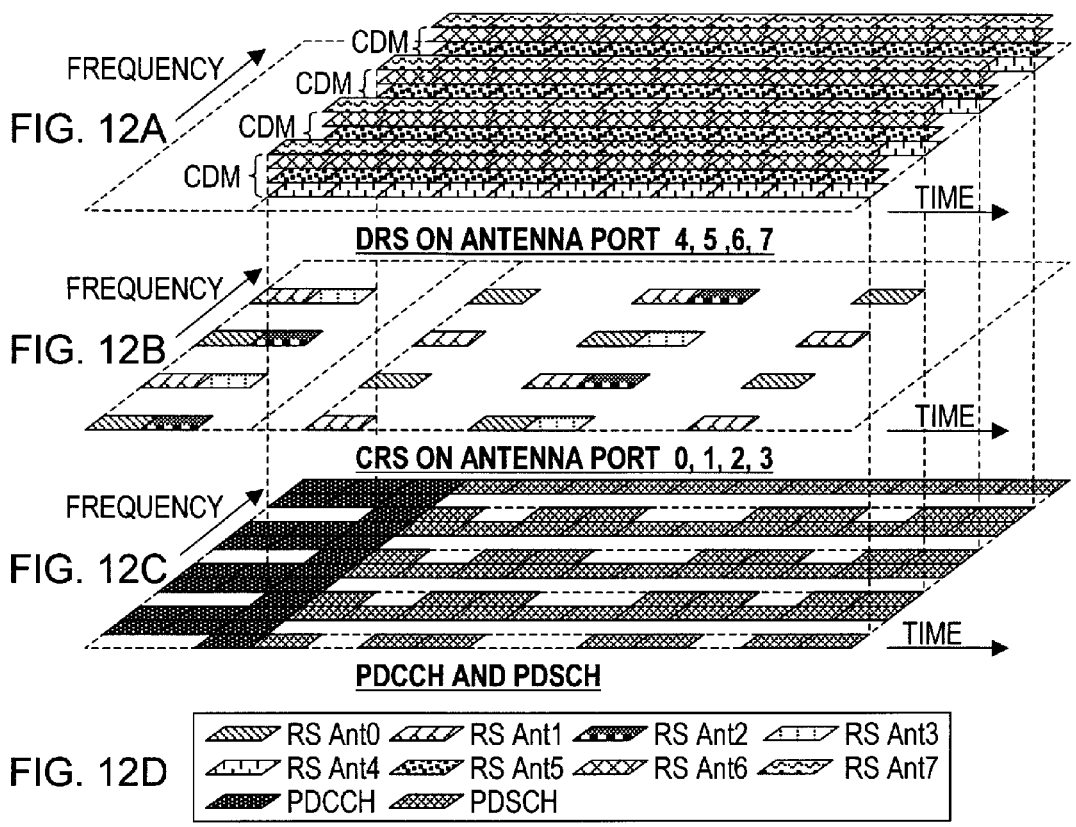

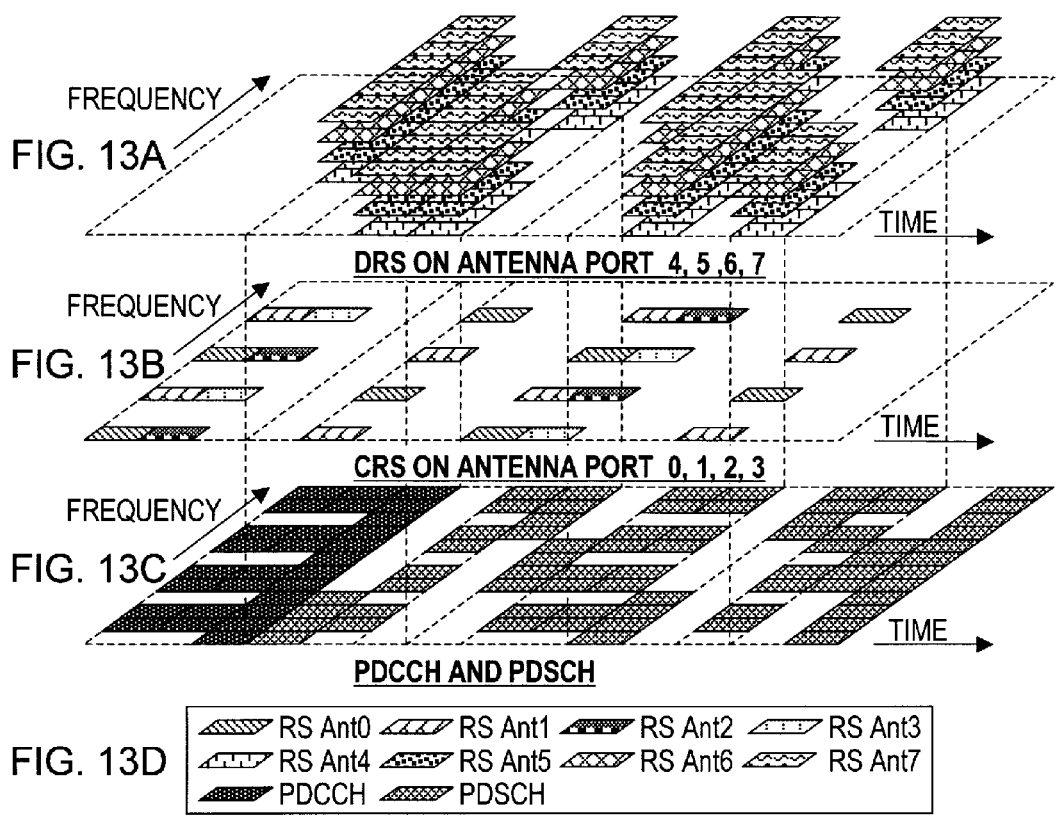

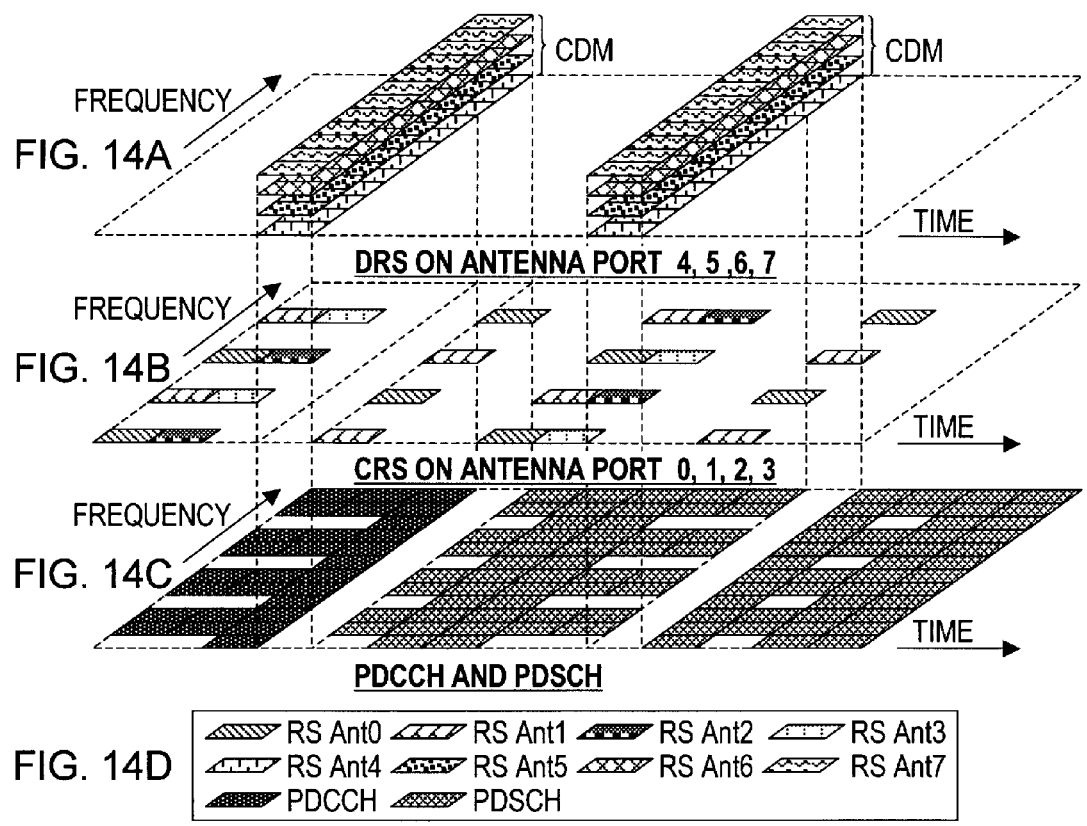

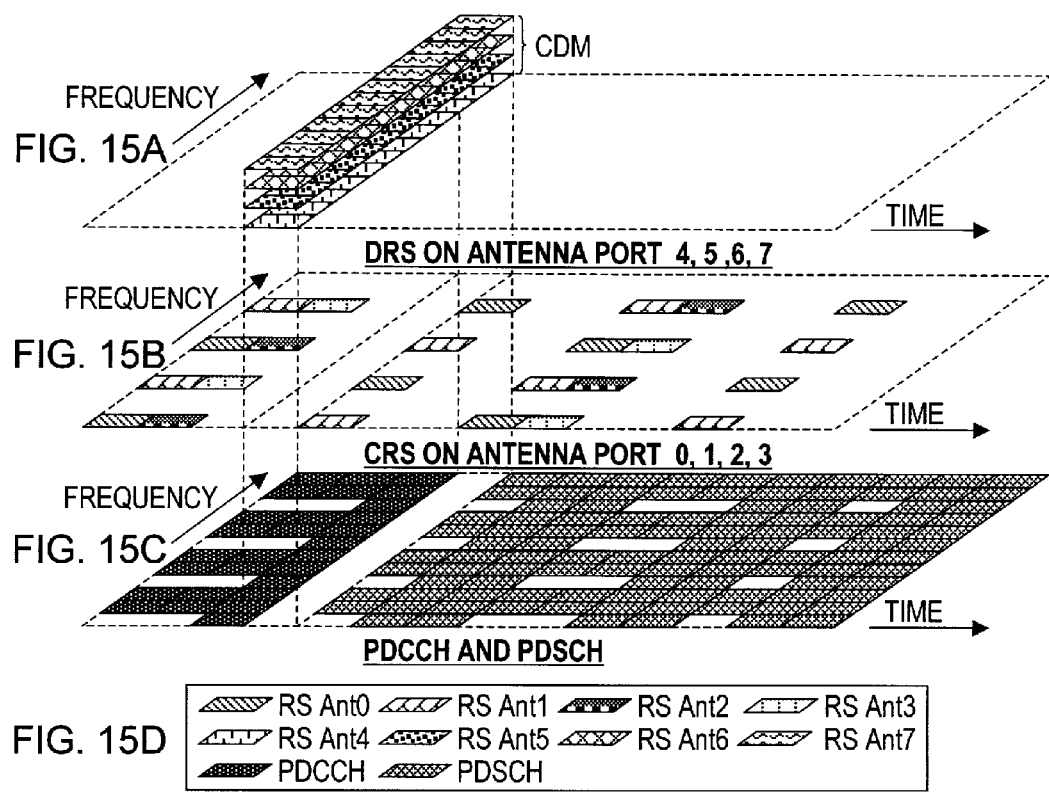

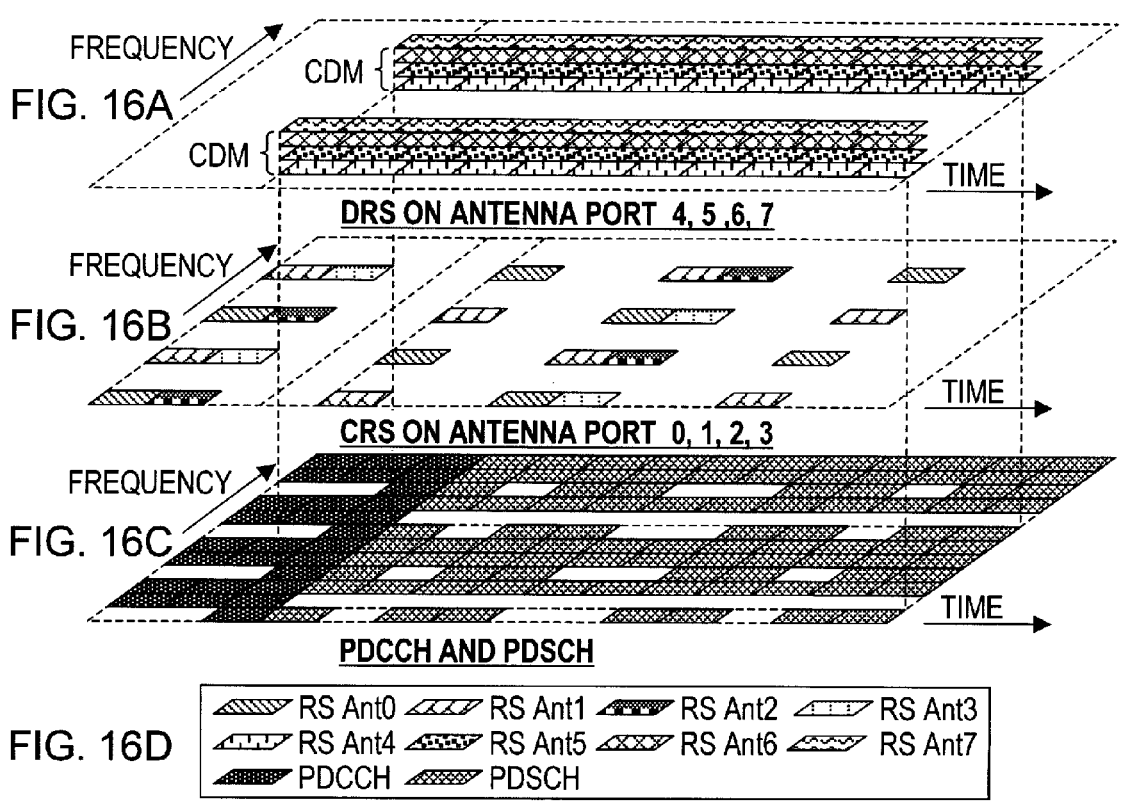

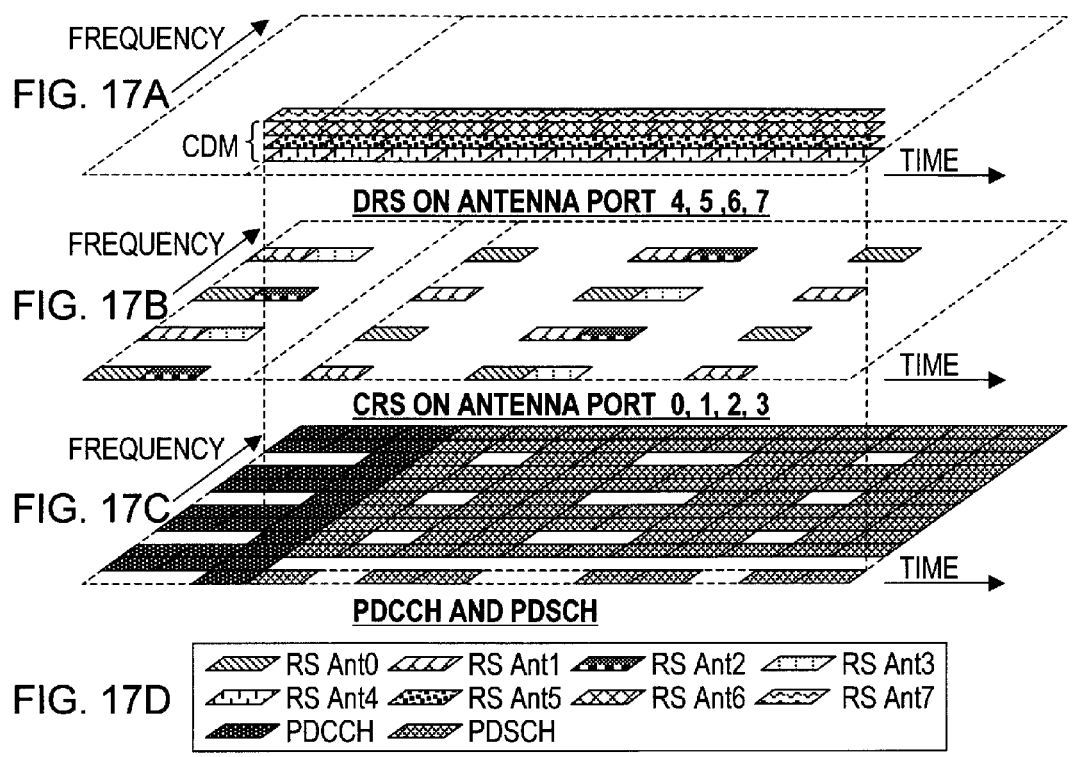

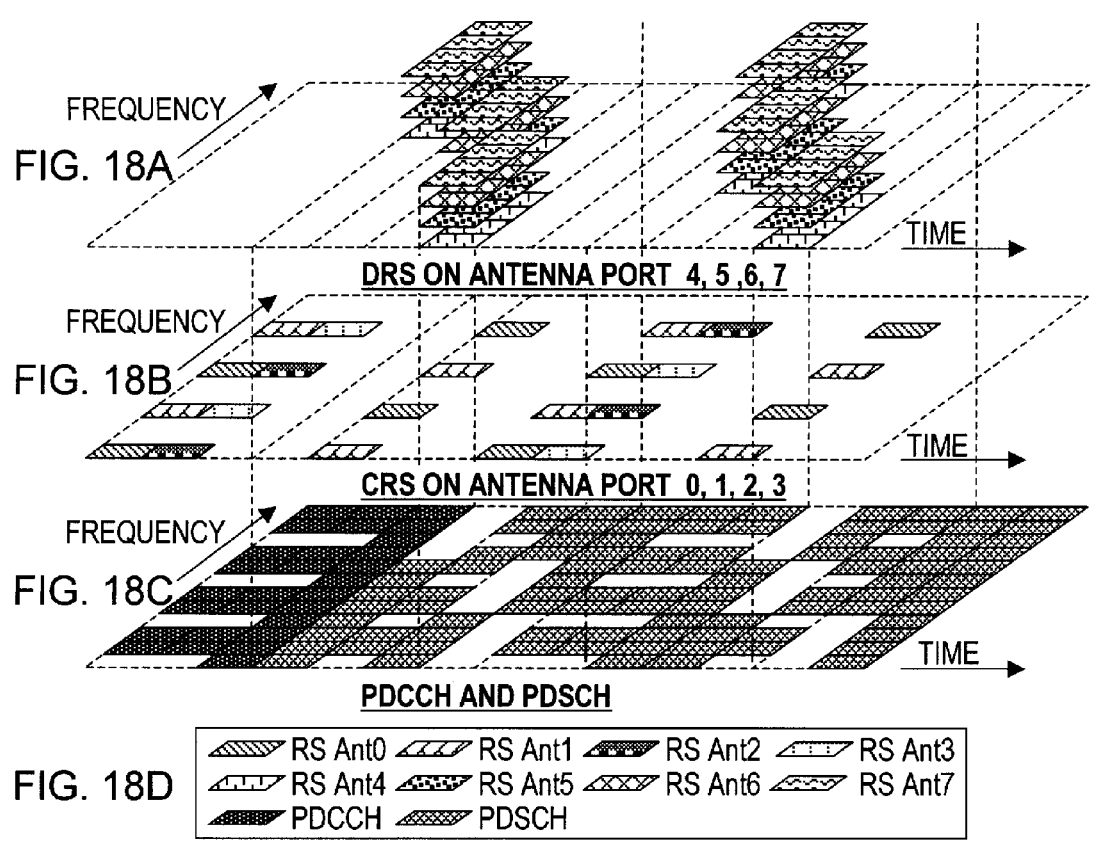

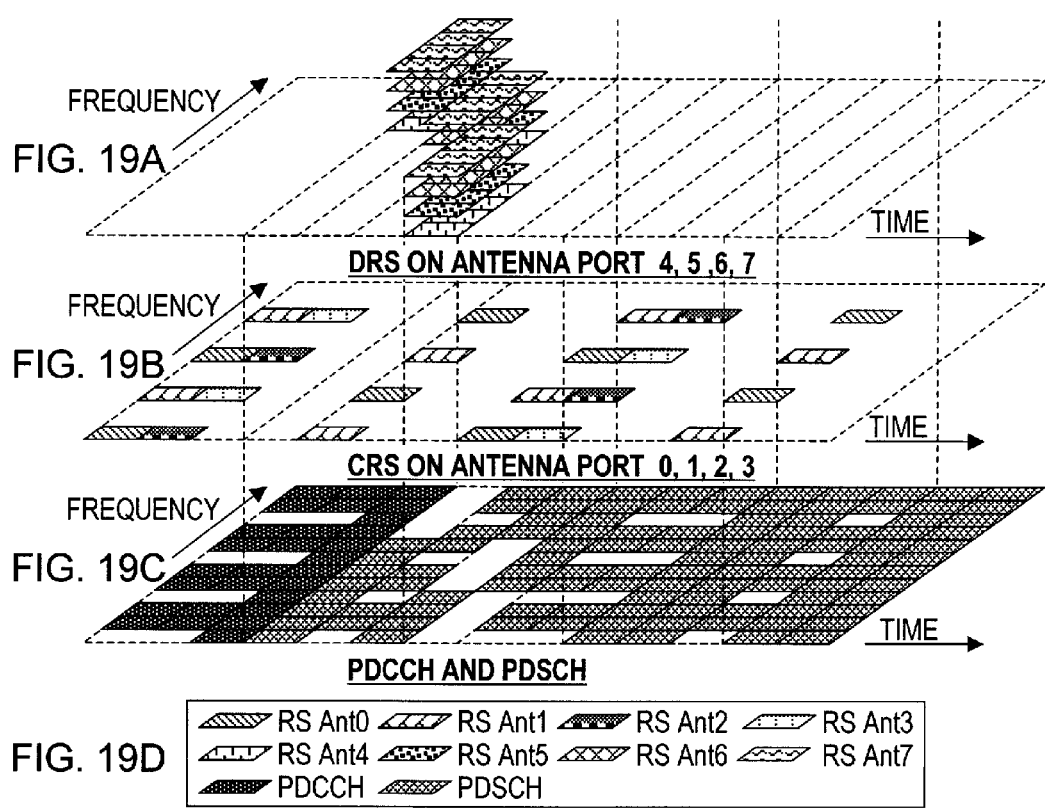

CRS IN LTE RB

SOLE-TYPE SEQUENCE

DUAL-TYPE SEQUENCE  DRS AS CRS IN LTE-ADVANCED RB

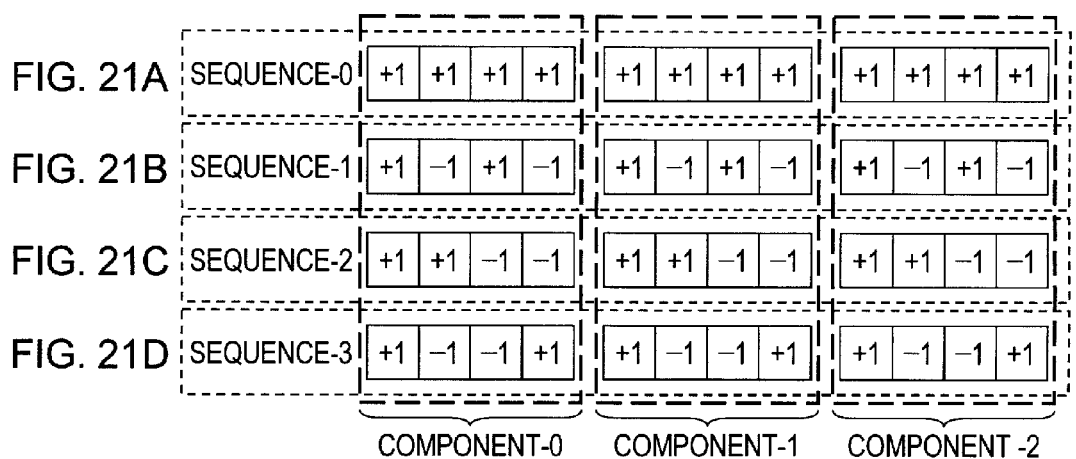
FIG. 21A SEQUENCE-0
FIG. 21B SEQUENCE-1
FIG. 21C SEQUENCE-2
FIG. 21D SEQUENCE-3
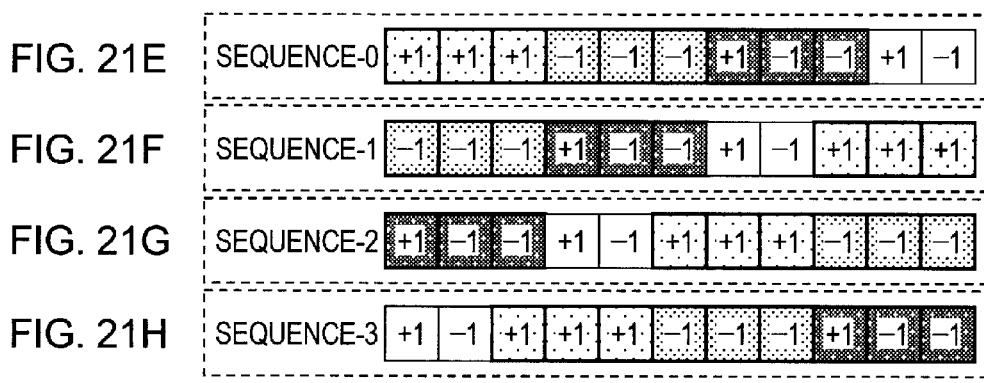
FIG. 21E SEQUENCE-0
FIG. 21F SEQUENCE-1
FIG. 21G SEQUENCE-2
FIG. 21H SEQUENCE-3

RADIO COMMUNICATION SYSTEM, BASE STATION APPARATUS, TERMINAL APPARATUS, AND RADIO COMMUNICATION METHOD IN RADIO COMMUNICATION SYSTEM

CROSS-REFERENCE TO RELATED APPLICATIONS

This application is a continuation of International Application No. PCT/JP2009/000394, filed on Feb. 2, 2009, now pending, herein incorporated by reference.

FIELD

The embodiments discussed herein are related to a radio communication system, a base station apparatus, a terminal apparatus, and a radio communication method in a radio communication system.

BACKGROUND

In conventional LTE (Long-term evolution) systems, which are one kind of radio communication system, common reference signals (hereafter, CRS) are used to carry out channel estimation, coherent detection, cell search and so forth, in the downlink. In LTE systems, data and so forth can be transmitted using a plurality of transmission antennas (MIMO: Multi-Input Multi-Output). Transmission is performed using at most four transmission antennas.

LTE-A (LTE-Advance) systems are another kind of radio communication system. In LTE-A systems, like in LTE systems, channel estimation and so forth is performed using CRS.

FIG. 25 is a diagram illustrating a configuration example of a subframe. FIG. 25 illustrates an example of transmission of CRS using four transmission antennas, with time on the abscissa axis and frequency on the ordinate axis. The base station transmits for instance CRS and data, from each antenna, using scheduled subframes. The terminals as well hold subframes such as those illustrated in FIG. 25, and receive the CRS, data and so forth from the base station at each time and each frequency.

FIG. 26 is a diagram illustrating an example of channel resource allocation. For instance, one resource block corresponds to the subframe of FIG. 25. In some cases, the base station transmits CRS, data and so forth in a situation where LTE compliant terminals are mixed with LTE-A compliant terminals. In such a case, the base station transmits CRS, data and so forth using two kinds of resource blocks (resource blocks for LTE compliant terminals and resource blocks for LTE-A compliant terminals), as illustrated in FIG. 26.
Non-patent Document 1: 3GPP TS 36.211
Non-patent Document 2: 3GPP TS 36.212
Non-patent Document 3: 3GPP TS 36.213
Non-patent Document 4: 3GPP TR 36.913 v8.0.0
Non-patent Document 5: 3GPP TSG RAN1. #55, R1-084251

In LTE and LTE-A, as described above, the base station allocates resources, for CRS transmission, to at most four transmission antennas (see FIG. 25).

In a case where the base station uses five or more transmission antennas, however, the way in which reference signal resources are to be allocated for the respective five or more transmission antennas has not been established yet.

SUMMARY

According to an aspect of the invention, a radio communication system includes: a base station apparatus; and a terminal apparatus, wherein the radio communication system performs radio communication between the base station apparatus and terminal apparatus, the base station apparatus includes: five or more transmission antennas; and a processor configure for holdings first scheduling information including a data channel region and a control channel region, and in which each of resources of a common reference signal transmitted from each of the fifth and subsequent transmission antennas is allocated respectively, to be different region from first region to that each of resources of a common reference signal transmitted from each of the transmission antennas up to an m-th antenna (m being an integer that satisfies $1 \leq m < 5$) is allocated, to overlap the data channel region to that a data is allocated or the control channel region to that a control signal is allocated, and to be a different region each other, and second scheduling information in which each of resources of a dedicated reference signal transmitted from each of the fifth and subsequent transmission antennas is allocated respectively to regions which is different from the first region, to overlap with each other in a region to that the data is not allocated in the data channel region or that the control signal is not allocated in the control channel region, and to be different region in a code region; and transmitting the data, the control signal, the common reference signal, and the dedicated reference signal, based on the first or second scheduling information, and the terminal apparatus includes: a radio communication interface configured for receiving the data, the control signal, and the common reference signal or the dedicated reference signal, based on the first or the second scheduling information; wherein the transmitting transmits the common reference signal in accordance with a predefined code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A to FIG. 5C are diagrams illustrating configuration examples of a subframe,
and FIG. 5D is an explanatory diagram;
FIG. 6A to FIG. 6C are diagrams illustrating another configuration example of a subframe,
and FIG. 6D is an explanatory diagram;
FIG. 7A to FIG. 7C are diagrams illustrating another configuration example of a subframe,
and FIG. 7D is an explanatory diagram.

FIG. 11A to FIG. 11C are diagrams illustrating another configuration example of a subframe, and FIG. 11D is an explanatory diagram;

FIG. 12A to FIG. 12C are diagrams illustrating another configuration example of a subframe, and FIG. 12D is an explanatory diagram;

FIG. 13A to FIG. 13C are diagrams illustrating another configuration example of a subframe, and FIG. 13D is an explanatory diagram;

FIG. 14A to FIG. 14C are diagrams illustrating another configuration example of a subframe, and FIG. 14D is an explanatory diagram;

FIG. 15A to FIG. 15C are diagrams illustrating another configuration example of a subframe, and FIG. 15D is an explanatory diagram;

FIG. 16A to FIG. 16C are diagrams illustrating another configuration example of a subframe, and FIG. 16D is an explanatory diagram;

FIG. 17A to FIG. 17C are diagrams illustrating another configuration example of a subframe, and FIG. 17D is an explanatory diagram;

FIG. 18A to FIG. 18C are diagrams illustrating another configuration example of a subframe, and FIG. 18D is an explanatory diagram;

FIG. 19A to FIG. 19C are diagrams illustrating another configuration example of a subframe, and FIG. 19D is an explanatory diagram;

FIG. 21A to FIG. 21D are diagram illustrating examples of code sequences, and FIG. 21E to FIG. 21H are diagrams illustrating other examples of code sequences;

DESCRIPTION OF EMBODIMENTS

Embodiments for carrying out the present invention are explained next.

First Embodiment

Figure 1:
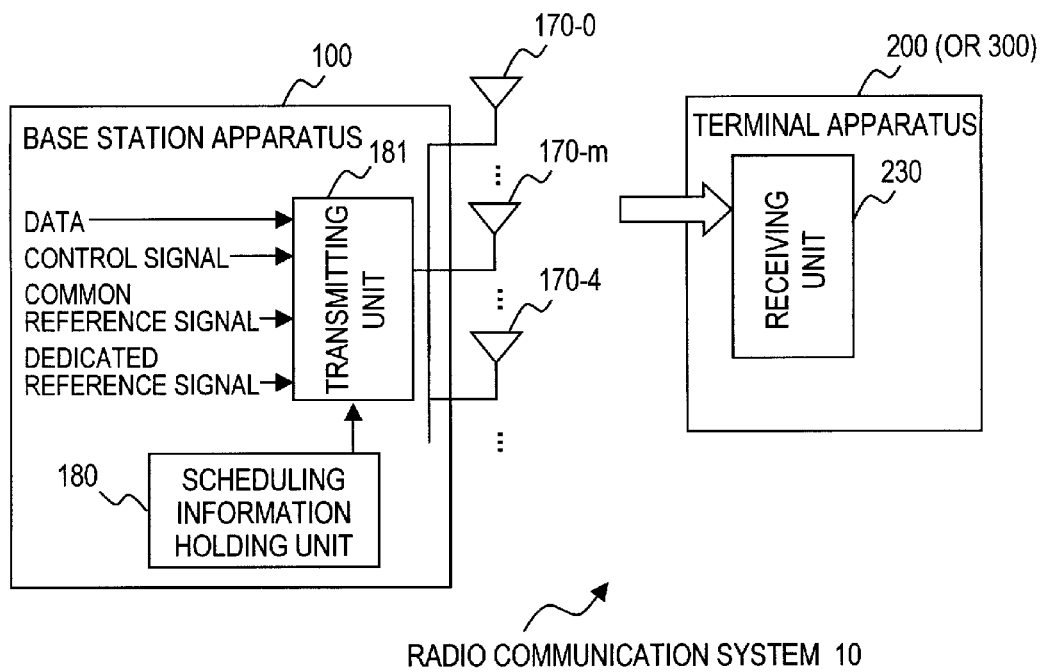
FIG. 1 is a diagram illustrating a configuration example of a radio communication system.

A first embodiment will be explained next. FIG. 1 is a diagram illustrating a configuration example of a radio communication system 10.

In the radio communication system 10 that performs radio communication between a base station apparatus 100 and a terminal apparatus 200 (or 300), the base station apparatus 100 comprises five or more transmission antennas 170, a scheduling information holding unit 180 that holds first scheduling information which has a data channel region and a control channel region, and in which resources of a common reference signal transmitted from each of a fifth and subsequent transmission antennas 170 are allocated to mutually dissimilar regions which are regions overlapping with the control channel region to which a control signal is allocated or the data channel region to which data is allocated, and are regions different from a first region to which there are allocated resources of a common reference signal that is transmitted from each of the transmission antennas up to an m-th antenna (m being an integer that satisfies 1≤m<5), and second scheduling information in which resources of a dedicated reference signal transmitted from each of a fifth and subsequent transmission antennas 170 are allocated to regions which are different from the first region, overlap with each other, are dissimilar regions in a code region, and are located in a portion having no data allocated thereto in the data channel region or in a portion having no control signal allocated thereto in the control channel region; and a transmitting unit 181 which, on the basis of the first or second scheduling information, transmits the data, the control signal, the common reference signal and the dedicated reference signal; wherein the terminal apparatus 200 (300) comprises a receiving unit 230 which, on the basis of the first or the second scheduling information, receives the data, a control signal, and the common reference signal or the dedicated reference signal; and the transmitting unit 181 transmits the common reference signal with a predefined code.

The transmitting unit 181 reads first scheduling information from the scheduling information holding unit 180, and, on the basis of the first scheduling information, transmits data, a control signal and a common reference signal that is transmitted by the transmission antennas 170.

The transmitting unit 181 reads second scheduling information from the scheduling information holding unit 180, and, on the basis of the second scheduling information, transmits data, a control signal, a common reference signal that is transmitted by transmission antennas 170-0 to 170-3, and a dedicated reference signal that is transmitted by transmission antennas 170-4, . . . .

On the basis of the first scheduling information, the receiving unit of the terminal apparatus 200 (300) receives data, the control signal, and the common reference signal transmitted by the transmission antennas 170, and, on the basis of the second scheduling information, receives data, the control signal, the common reference signal that is transmitted by transmission antennas 170-0 to 170-3, and the dedicated reference signal transmitted by the transmission antennas 170-4, In the first scheduling information, the common reference signal transmitted by transmission antennas from transmission antenna 170-4 onwards is transmitted using a resource overlapping with data or a control signal. Common reference signals from five or more transmission antennas 170-4, . . . can be transmitted as a result. The common reference signal is transmitted using overlapping resources, and hence the resources can be used effectively.

In the second scheduling information, dedicated reference signals transmitted by transmission antennas from transmission antenna 170-4 onwards are transmitted using resources not overlapping with data and so forth. The dedicated reference signals are transmitted using mutually overlapping resources. As a result, dedicated reference signals can be transmitted from five or more transmission antennas 170-4, . . . . The dedicated reference signals are transmitted on the basis of mutually overlapping resources, without using other resources, and hence the resources can be used effectively.

Second Embodiment

Figure 2:
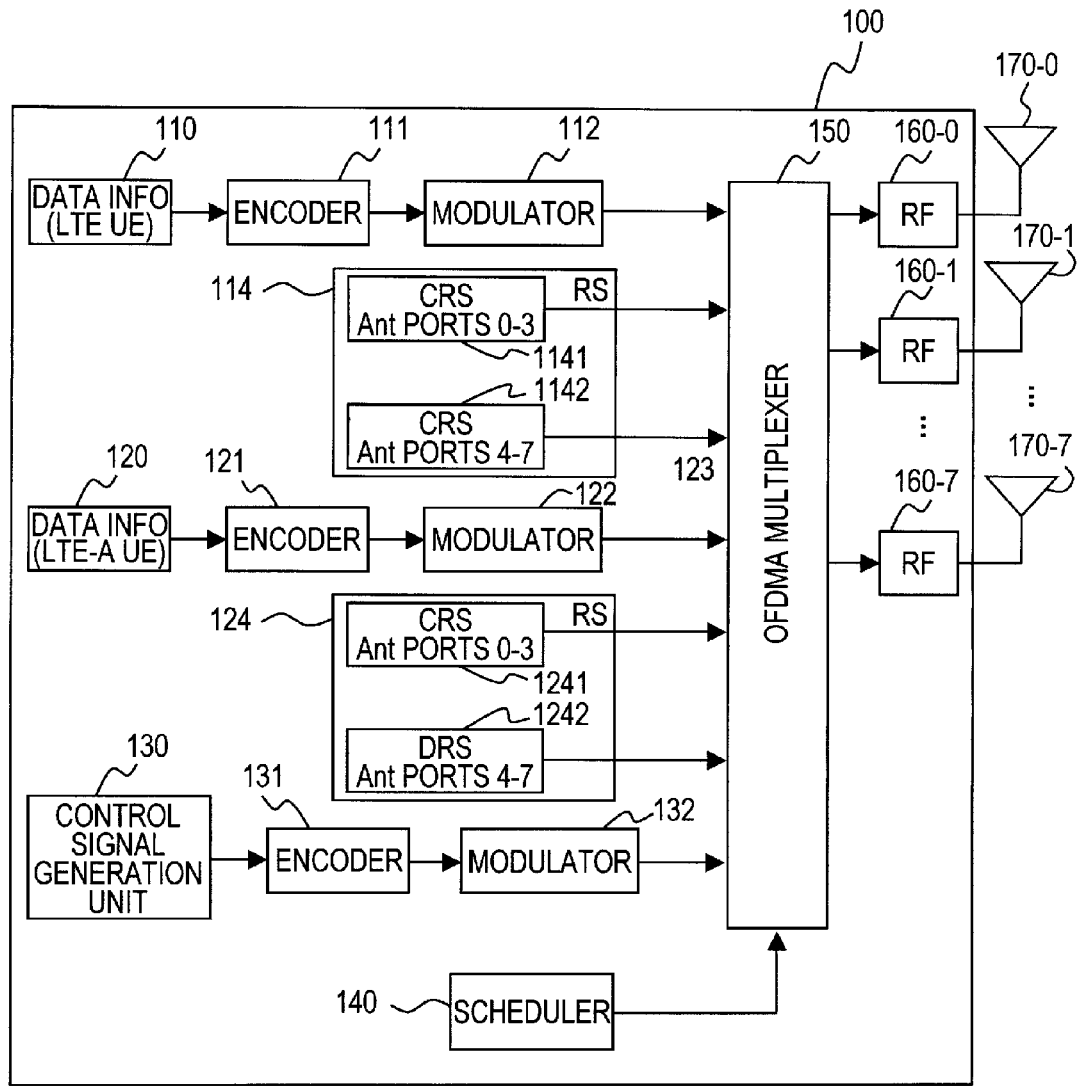
FIG. 2 is a diagram illustrating a configuration example of a base station.
Figure 3:
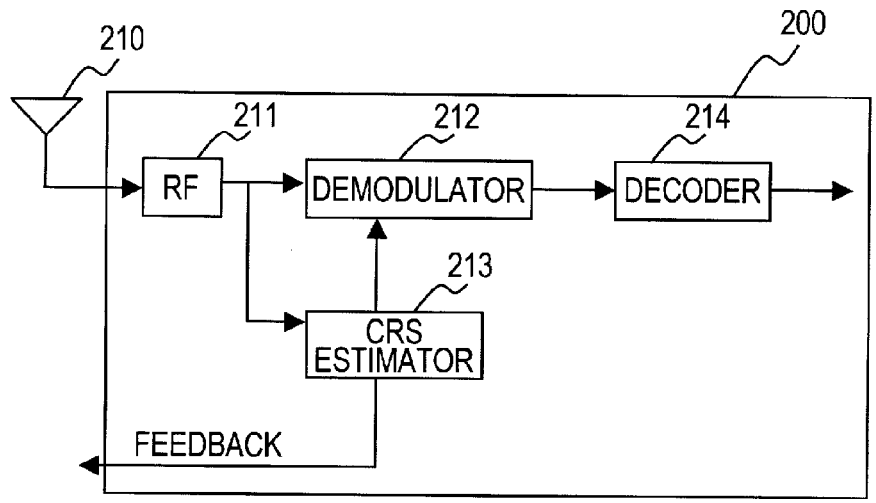
FIG. 3 is a diagram illustrating a configuration example of a terminal apparatus.
Figure 4:
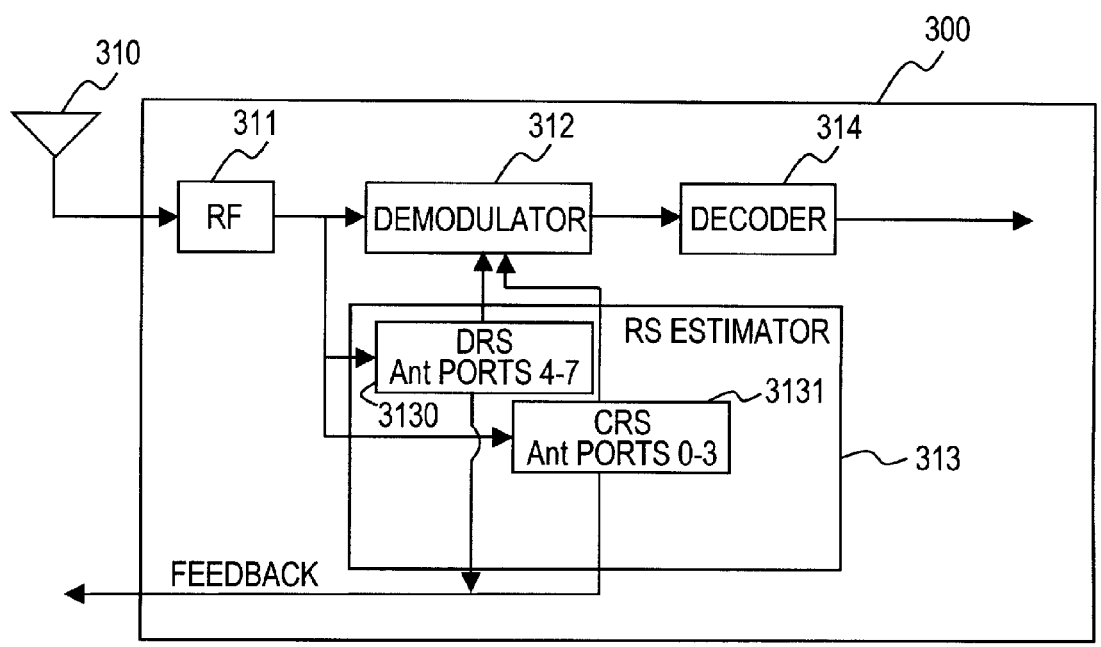
FIG. 4 is a diagram illustrating a configuration example of another terminal apparatus.

FIG. 2 is a diagram illustrating a base station apparatus (hereafter, base station) 100 in the radio communication system 10, and FIG. 3 and FIG. 4 are diagrams illustrating configuration experimental examples of terminal apparatuses 200, 300.

As illustrated in FIG. 2, the base station 100 comprises a first encoding unit (Encoder) 111, a first modulating unit (Modulator) 112, a first RS (reference signal) generation unit 114, a second encoding unit (Encoder) 121, a second modulating unit 122, a second RS generation unit 124, a control signal generation unit 130, a third encoding unit 131, a third modulating unit 132, a scheduler 140, a multiplexing unit 150, RF (Radio Frequency) units 160-0 to 160-7, and transmission antennas 170-0 to 170-7. The base station 100 transmits data and the like using the plurality of transmission antennas 170-0 to 170-7 (MIMO (multi-input multi-output)).

The first encoding unit 111 receives the input of data 110 that can be received by the LTE compliant terminal 200, and outputs encoded data.

The first modulating unit 112 modulates the data outputted by the first encoding unit 111, and outputs the result.

The first RS generation unit 114 comprises a first CRS generation unit 1141 and a second CRS generation unit 1142.

The first CRS generation unit 1141 generates a CRS (common reference signal) that is transmitted by transmission antennas 170-0 to 170-3.

The second CRS generation unit 1142 generates a CRS that is transmitted by transmission antennas 170-4 to 170-7.

The second encoding unit 121 receives the input of data 120 that can be received by the LTE-A compliant terminal 300, and outputs encoded data.

The second modulating unit 122 modulates the data outputted by the second encoding unit 121, and outputs the result.

The second RS generation unit 124 comprises a third CRS generation unit 1241 and a DRS generation unit 1242.

The third CRS generation unit 1241 generates a CRS that is transmitted by transmission antennas 170-0 to 170-3.

The DRS generation unit 1242 generates a DRS (dedicated reference signal) that is transmitted by transmission antennas 170-4 to 170-7.

The control signal generation unit 130 generates a control signal.

The third encoding unit 131 encodes a control signal that is outputted by the control signal generation unit 130.

The third modulating unit 132 modulates the encoded control signal outputted by the third encoding unit 131.

The scheduler 140 holds scheduling information (subframe or radio frame), and outputs the scheduling information to the multiplexing unit 150. The scheduling information includes first scheduling information for the LTE compliant terminal 200, and second scheduling information for the LTE-A compliant terminal 300. The details of the scheduling information are described further on.

On the basis of first radio frame scheduling information from the scheduler 140, the multiplexing unit 150 performs, for instance, mapping on the data from the first modulating unit 112, the CRS from the first RS generation unit 114, and the control signal from the control signal generation unit 130. On the basis of the second scheduling information from the scheduler 140, the multiplexing unit 150 performs, for instance, mapping of the data from the second modulating unit 122, the CRS and DRS from the second RS generation unit 124, and the control signal from the control signal generation unit 130. The multiplexing unit 150 multiplexes the mapped two sets of data, and outputs the result.

RF units 160-0 to 160-7 convert respective data and the like from the multiplexing unit 150 to radio signal, and output the radio signal.

Transmission antennas 170-0 to 170-7 transmit the radio signal from RF units 160-0 to 160-7 to the terminals 200, 300.

A configuration example of the terminals 200, 300 of the radio communication system 10 is explained next. FIG. 3 is a diagram illustrating a configuration example of the LTE compliant terminal 200, and FIG. 4 is a diagram illustrating a configuration example of the LTE-A compliant terminal 300.

The terminal 200 comprises a reception antenna 210, an RF unit 211, a demodulating unit (Demodulator) 212, a CRS estimating unit (CRS Estimator) 213 and a decoding unit (Decoder) 214.

The reception antenna 210 receives a radio signal that includes data, CRS and so forth, transmitted by the base station 100.

The RF unit 211 converts the radio signal received by the reception antenna 210 to data or the like of a time prior to radio signal conversion in the base station 100.

The demodulating unit 212 demodulates data of the output from the RF unit 211.

The decoding unit 214 decodes the demodulated data. The demodulated data is subjected to a voice process or the like in various subsequent processing units.

On the basis of scheduling information, the CRS estimating unit 213 estimates a CRS of the signal outputted by the RF unit 211. The scheduling information is identical to the first scheduling information held in the base station 100, and is held for instance by the CRS estimating unit 213. In the present embodiment, the CRS estimating unit 213 estimates the CRS that is transmitted from transmission antennas 170-0 to 170-3 of the base station 100.

The CRS estimating unit 213 performs, for instance, channel estimation and coherent detection, on the basis of the CRS. In this case, the CRS estimating unit 213 transmits, for instance, a measurement result or the like as feedback information (for instance, CQI (Channel Quality Indicator)) to the base station 100. The CRS estimating unit 213 outputs the detection result of coherent detection to the demodulating unit 212. The demodulating unit 212 demodulates data on the basis of the detection result.

The LTE-A compliant terminal 300 comprises a reception antenna 310, an RF unit 311, a demodulating unit (Demodulator) 312, an RS estimating unit (RS Estimator) 313 and a decoding unit (Decoder) 314.

The reception antenna 310 receives a radio signal transmitted by the base station 100.

The RF unit 311 converts the radio signal received by the reception antenna 310 to data or the like of a time prior to radio signal conversion in the base station 100.

The demodulating unit 312 demodulates data of the output from the RF unit 311.

The decoding unit 314 decodes the demodulated data. The demodulated data is subjected to a voice process or the like in various subsequent processing units.

The RS estimating unit 313 comprises a DRS estimating unit 3130 and a CRS estimating unit 3131.

The DRS estimating unit 3130 estimates the DRS that is transmitted by transmission antennas 170-4 to 170-7 of the base station 100, for the output of the RF unit 311. The DRS estimating unit 3130 estimates the DRS on the basis of scheduling information. The scheduling information is identical to the second scheduling information held in the base station 100. For instance, the DRS estimating unit 3130 holds such scheduling information.

The DRS is a reference signal allocated to each terminal 300. The terminal 300 performs, for instance, channel estimation and coherent detection using this DRS, as a result of which channel estimation and so forth can be performed with higher precision than when using a CRS. The DRS estimating unit 3130 transmits the quality measurement result, for instance in the form of CQI, to the base station 100. The DRS estimating unit 3130 outputs the coherent detection result to the demodulating unit 312. The demodulating unit 312 demodulates data on the basis of the detection result.

The CRS estimating unit 3131 estimates the CRS that is transmitted by transmission antennas 170-0 to 170-3 of the base station 100, for the output of the RF unit 311. The CRS estimating unit 3131 may estimate the CRS that is transmitted from transmission antennas 170-4 to 170-7. CRS estimation is performed on the basis of scheduling information (for instance, the first and second scheduling information, or the second scheduling information). For instance, the CRS estimating unit 3131 holds such scheduling information.

The CRS estimating unit 3131 performs processes such as quality measurement and coherent detection, on the basis of the estimated CRS, transmits the measurement result, for instance in the form of CQI, to the base station 100, and outputs the detection result to the demodulating unit 312. The demodulating unit 312 demodulates data on the basis of the detection result.

From among the CRS, the LTE compliant terminal 200 estimates the CRS transmitted from transmission antennas 170-0 to 170-3, and the LTE compliant terminal 300 estimates the CRS transmitted from transmission antennas 170-0 to 170-7. Such estimation may be performed on the basis of the above-described scheduling information (first scheduling information or second scheduling information).

For instance, the terminals 200, 300 may read a control signal from the reception signal, and determine thereafter whether or not data is to be read. In this case, the control signal is for instance demodulated by the CRS estimating unit 213 of the terminal 200, and it is determined, on the basis of the control signal, whether the data is to be read, and if so, the result is notified to the demodulating unit 212. On the basis of the above notification, the demodulating unit 212 for instance demodulates the data. Similarly, the DRS estimating unit 3130 or the CRS estimating unit 3131 in the terminal 300 determine whether or not data is to be read, through demodulation or the like of the control signal. If data is to be read, the result is notified to the demodulating unit 312.

An explanation follows next on an example of the scheduling information held in, for instance, the scheduler 140 of the base station 100. There are two types of scheduling information, namely first scheduling information (for instance, scheduling information for the LTE compliant terminal 200) and second scheduling information (for instance, scheduling information for the LTE-A compliant terminal 300).

The first scheduling information includes resource elements of the CRS that are transmitted by transmission antennas 170-4 to 170-7, and the second scheduling information includes resource elements of the DRS that are transmitted by transmission antennas 170-4 to 170-7. The terminal 200 can, for instance, receive the CRS on the basis of the first scheduling information, and the terminal 300 can, for instance, receive the DRS on the basis of the second scheduling information.

The first scheduling information is explained next. FIG. 5A to FIG. 5C are diagrams illustrating configuration examples of a subframe. The scheduler 140 of the base station 100, the CRS estimating unit 213 of the terminal 200, the RS estimating unit 313 of the terminal 300 and so forth hold the subframe illustrated in FIG. 5A to FIG. 5C, as scheduling information.

To facilitate explanation, the subframe in FIG. 5A to FIG. 5C is depicted divided into three layers, although the actual subframe that is held results from adding these layers. In FIG. 5A to FIG. 5C the abscissa axis represents a time axis direction, the ordinate axis represents a frequency axis direction, and each block represents a resource element. FIG. 5D is a diagram for explaining the resource elements illustrated in FIG. 5A and so forth.

As illustrated in FIG. 5A to FIG. 5C, the resource elements of the CRS transmitted by transmission antennas 170-0 to 170-3 are allocated to regions such that there is no overlap with resource elements to which a control signal (PDCCH) and data (PDSCH) are allocated.

The resource elements of CRS transmitted from transmission antennas 170-4 to 170-7 are allocated to regions such that there is overlap with resource elements to which data is allocated (also called "Superposition manner"), but no overlap with resource elements of CRS transmitted by transmission antennas 170-0 to 170-3.

In the example of FIG. 5A and so forth, the resource elements (a total of 12) of each CRS transmitted from respective transmission antennas 170-4 to 170-7 are allocated to resource element regions of data, across a plurality of frequency bands (plurality of frequency regions) of one subframe, at a same timing (same time region).

The CRS from transmission antennas 170-4 to 170-7 of the base station 100 can thus be transmitted through allocation of the resource elements of the CRS transmitted from transmission antennas 170-4 to 170-7. The terminals 200, 300 can receive the CRS at a predefined timing and frequency, on the basis of such scheduling information.

The CRS is transmitted from transmission antennas 170-4 to 170-7 with a predefined code. For instance, such a code is generated by the second and third CRS generation units 1142, 1241 of the base station 100. Since the CRS is transmitted with a predefined code, the terminals 200, 300 can for instance demodulate the CRS by distinguishing the CRS from data at regions of overlap with the CRS. The predefined codes are explained further on.

Also, the base station 100 transmits data of regions overlapping with the CRS at a higher transmission power than that for the CRS. The terminals 200, 300 can for instance demodulate data by distinguishing data from the CRS on the basis of data that is transmitted at a higher transmission power. The transmission power is described further on. Although the transmission power of the CRS is smaller than that of data, the CRS is transmitted using a plurality of resource elements, and hence the CRS can be read by aggregating the resource elements.

A variation of the first scheduling information is explained next. FIG. 6A to FIG. 12D are diagrams illustrating such a variation.

FIG. 6A to FIG. 6C is an example in which each CRS transmitted by respective transmission antennas 170-4 to 170-7 is allocated to a same frequency band within one subframe, in the data region of one subframe. In case that the base station 100 performs encoding in the frequency direction at a given timing, the CRS from a same transmission antenna 170-4 to 170-7 are distributed through allocation of the CRS as in FIG. 6A. This is advantageous, for instance, for CRS decoding in the terminals 200, 300.

FIG. 7A to FIG. 7D is an example in which each CRS transmitted by respective transmission antennas 170-4 to 170-7 is allocated, in the data region, in such a manner that there is no mutual overlapping, in the frequency region and the time region, of mutually dissimilar resource elements in the frequency region and the time region. To decode the CRS, each CRS is allocated to a distributed region in the terminals 200, 300. Therefore, the error rate can be reduced vis-à-vis the case illustrated in FIG. 5A and so forth.

Figure 8A:
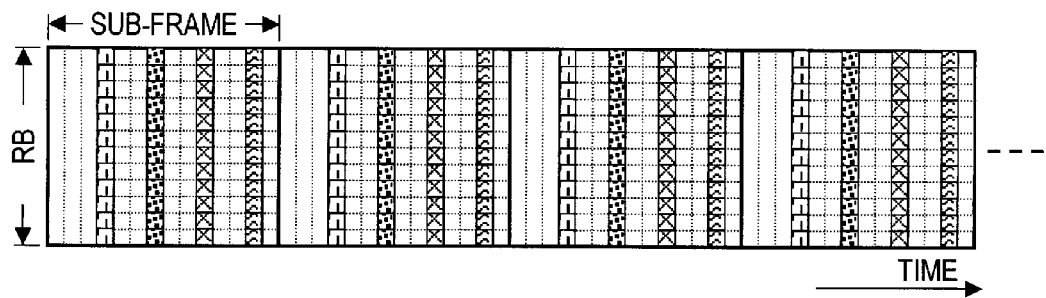
FIG. 8A to FIG. 8C are diagrams illustrating another configuration example of a subframe.
Figure 8B:
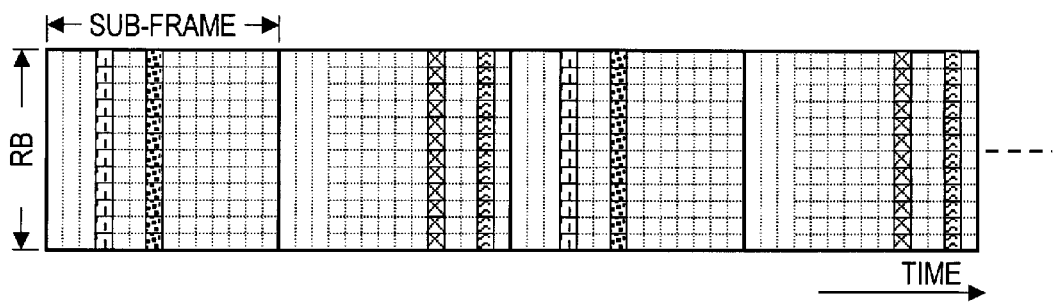
Figure 8C:
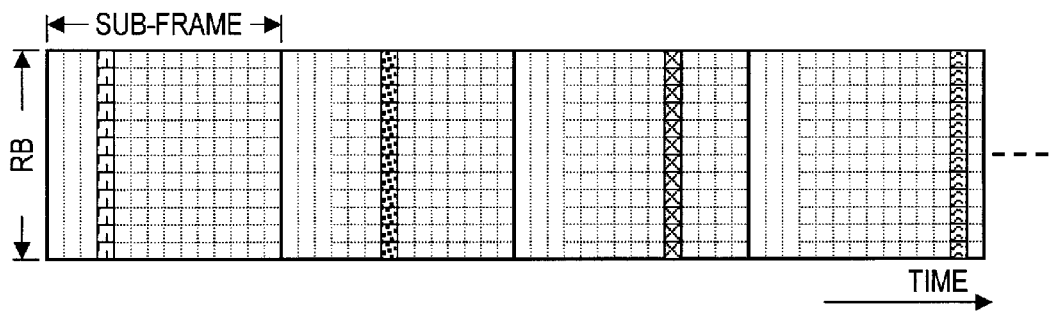

FIG. 8A to FIG. 8C are diagrams illustrating pattern configuration examples of each CRS transmitted by respective transmission antennas 170-4 to 170-7.

FIG. 8A, which corresponds to the example of FIG. 5A, is an example in which all the CRS of transmission antennas 170-4 to 170-7 are allocated in each subframe. The example of FIG. 8A is an example of a subframe having the highest CRS density.

FIG. 8B is an example in which the CRS from transmission antennas 170-4, 170-5 are allocated in the first subframe, the CRS from transmission antennas 170-6, 170-7 are allocated in the second subframe, and the foregoing allocation is repeated. Not all CRS of transmission antennas 170-4 to 170-7 are allocated within one subframe, and thus CRS density can be lowered. CRS transmission load is reduced in each subframe, and the CRS resource area is smaller than in the example of FIG. 8A. Therefore, the terminals 200, 300 can receive the data allocated to the data region with a low error rate.

In the example of FIG. 8B there is alternate switching between the first subframe and the second subframe. For instance, the scheduler 140 of the base station 100 may alternately switch the subframes at a predefined timing, and output the result to the multiplexing unit 150. The terminals 200, 300, for instance, may receive the CRS and so forth through alternate switching of the subframes held in the CRS estimating unit 213, the DRS estimating unit 3130 and the CRS estimating unit 3131.

FIG. 8C is an example in which each CRS transmitted by respective transmission antennas 170-4 to 170-7 is allocated in each subframe. In this example four subframes are repeated sequentially. For instance, the scheduler 140 of the base station 100 holds four subframes, performs sequential switching at a predefined timing, and outputs the result to the multiplexing unit 150. The terminals 200, 300 may perform sequential switching of the subframes held in the CRS estimating unit 213 and so forth. Switching units that perform such switching are the multiplexing unit 150 or the scheduler 140, the CRS estimating unit 213, the DRS estimating unit 3130 and the CRS estimating unit 3131.

Figure 9A:
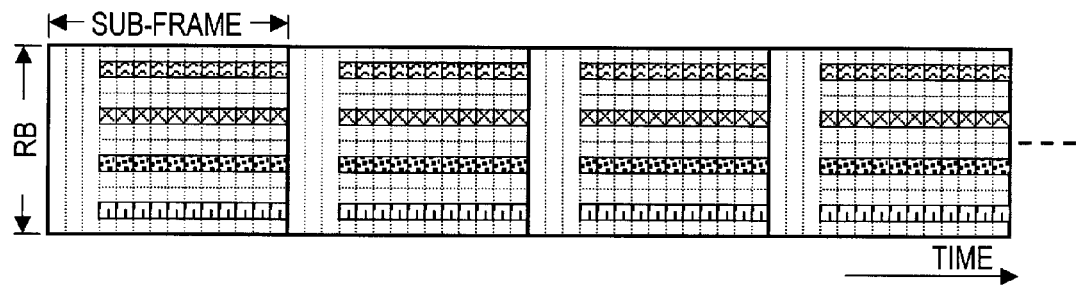
FIG. 9A to FIG. 9C are diagrams illustrating another configuration example of a subframe.
Figure 9B:
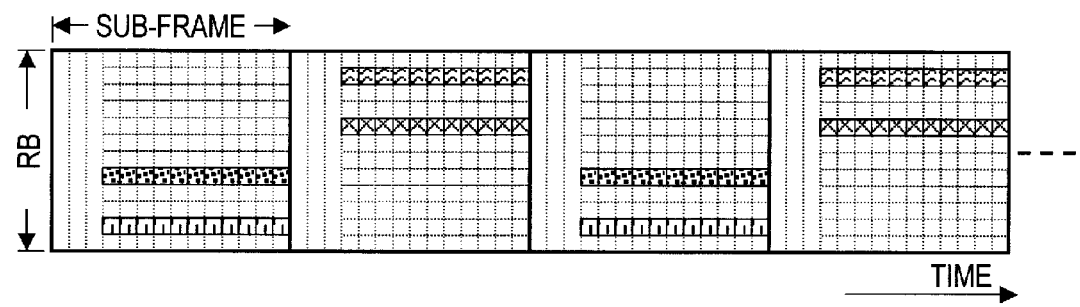
Figure 9C:
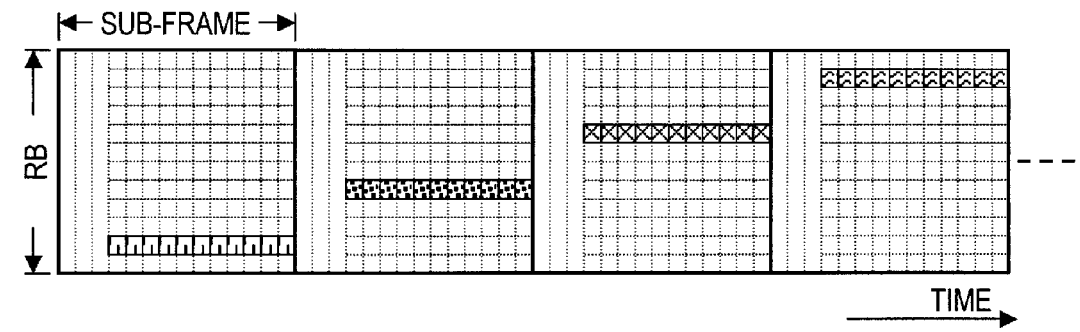

FIG. 9A to FIG. 9C is an example corresponding to FIG. 6A and so forth. FIG. 9A illustrates an example in which each CRS is allocated in each subframe; FIG. 9B illustrates an example in which two CRS are alternately allocated in each subframe; and FIG. 9C illustrates an example in which each CRS is allocated in a respective subframe. In the present example as well, the CRS transmission load in the base station 100 is reduced, and the terminals 200, 300 can receive data with a low error rate, in the same way as in FIG. 8B and so forth.

Figure 10A:
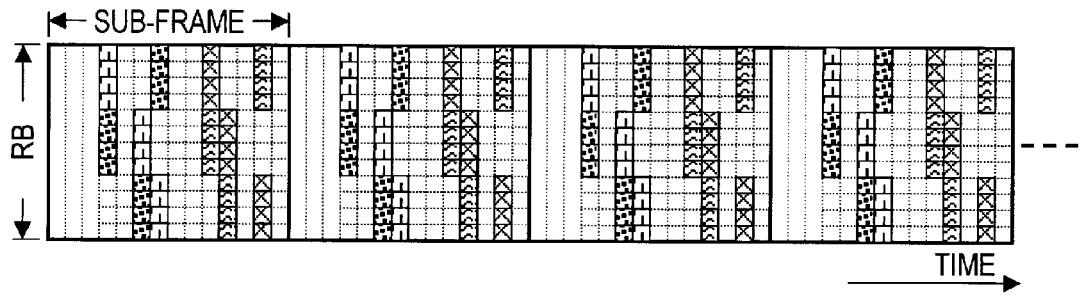
FIG. 10A to FIG. 10C are diagrams illustrating another configuration example of a subframe.
Figure 10B:
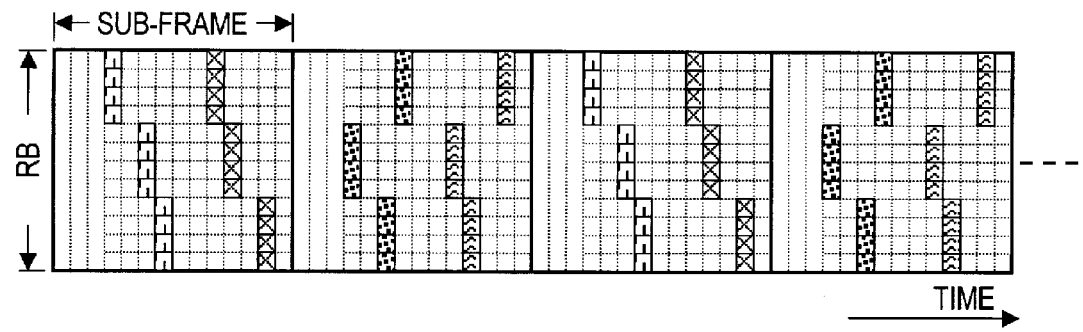
Figure 10C:
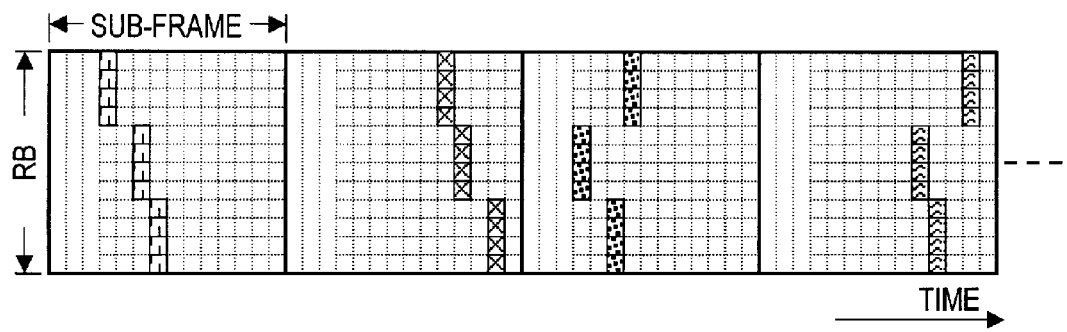

FIG. 10A to FIG. 10C is an example corresponding to FIG. 7A and so forth. FIG. 10A is an example in which the CRS are allocated, to the highest density, in such a way so as not to overlap with each other in the frequency region and the time region. FIG. 10B illustrates an example of such a case in which two CRS are alternately allocated in each subframe, and FIG. 10C illustrates an example in which each CRS is allocated in a respective subframe. In the above cases as well, the CRS transmission load in the base station 100 is reduced, and the terminals 200, 300 can receive data with a low error rate.

The second scheduling information is explained next. The second scheduling information includes DRS resources.

FIG. 11A to FIG. 11C are diagrams illustrating an example of the second scheduling information. To facilitate explanation, the subframe in FIG. 11A to FIG. 11C is depicted divided into three layers, although the actual subframe that is held in the base station 100 and in the terminal 300 results from adding these layers. In FIG. 11A to FIG. 11C the abscissa axis represents a time axis direction, the ordinate axis represents a frequency axis direction, and each block represents a resource element. FIG. 11D is a diagram for explaining the resource elements illustrated in FIG. 11A and so forth.

As illustrated in FIG. 11A, the DRS transmitted from respective transmission antennas 170-4 to 170-7 are allocated, in a data region (PDSCH), to regions at which data is not allocated, and such that resource elements of each CRS transmitted from respective transmission antennas 170-0 to 170-3 do not overlap, but such that there overlap the resource elements of each DRS that is transmitted by respective transmission antennas 170-4 to 170-7 (this is referred to as "CDM (Code Division Multiplexing) manner"). Each DRS transmitted from respective transmission antennas 170-4 to 170-7 is allocated to mutually dissimilar regions in the code region (middle and top in FIG. 11A).

Allocation of DRS to a region that comprises no data allows the terminal 300, for instance, to receive the DRS with a low error rate, and allows the terminal 300 to perform, for instance, quality measurement and coherent detection for demodulation, with high precision, using the individually allocated DRS.

The resource elements of the DRS transmitted from respective transmission antennas 170-4 to 170-7 are allocated overlappingly. Therefore, the resource elements can be used more effectively than in a case where each DRS is allocated to a respective different region.

A variation of the second scheduling information is explained next. FIG. 12A to FIG. 12C is an example in which all DRS transmitted from transmission antennas 170-4 to 170-7 are allocated to a same frequency in one subframe, in a data region in the subframe. As in the example of FIG. 6A, DRS are distributed in a case where encoding is performed in the frequency axis direction. This is advantageous, as a result, for DRS decoding in the terminal 300.

FIG. 13A to FIG. 13D are examples of DRS allocation in such a manner that there is no mutual overlapping, in the frequency region and time region, of mutually dissimilar resource elements in the frequency region and the time region, in a data region. As in FIG. 7A and so forth, the DRS are allocated to distributed regions. Therefore, the error rate can be reduced vis-à-vis the case illustrated in FIG. 11A and so forth.

FIG. 14A to FIG. 19D illustrate configuration examples of DRS patterns. Herein, there is no allocation of all DRS in each subframe. Instead, two DRS may be allocated in each subframe, as illustrated in FIG. 14A, or one DRS may be allocated in each subframe, as illustrated in FIG. 15A. The DRS density in one subframe is thus lower, and hence the DRS transmission load in the base station 100 can be reduced. Also, there are more resource elements to which data is allocated in the data region, than in the case of FIG. 11A. Proportionally more data can be transmitted as a result by the base station 100, and for instance there can be increased the throughput in the terminal 300. In the examples of FIG. 14A and FIG. 15A, DRS are allocated across the entire frequency band of one subframe, at a same timing.

FIG. 16A to FIG. 16D are examples in which two overlapping DRS are allocated in one subframe, so that the DRS density is lower than in the case of FIG. 12A and so forth where four DRS are allocated. FIG. 17A to FIG. 17D are examples in which one overlapping DRS is allocated in one subframe. The DRS density is yet lower.

FIG. 18A to FIG. 19D are also examples in which DRS density is lower.

In such low-density subframes, the resource elements need only be within one subframe, for at least one DRS, as illustrated in FIG. 8A to FIG. 10C. Also, alternate switching may be performed as illustrated in FIG. 8A to FIG. 10C. Switching units that perform such switching are the multiplexing unit 150 or the scheduler 140, the CRS estimating unit 213, the DRS estimating unit 3130 and the CRS estimating unit 3131.

The DRS transmission load of the base station 100 is reduced in the case of reduced DRS density, and the throughput in the terminal 300 can be enhanced on account of the increase in resource elements to which data is allocated.

Figure 20A:
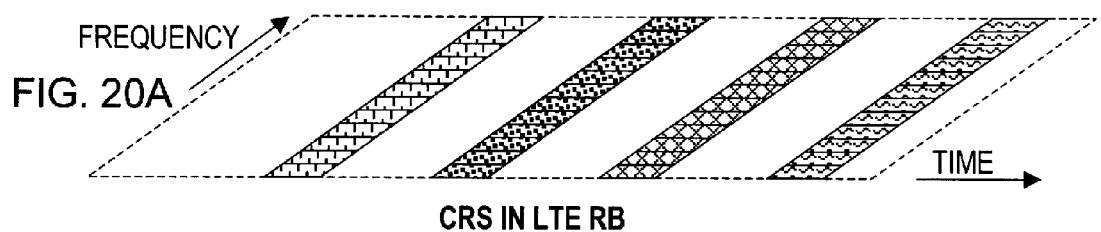
FIG. 20A and FIG. 20B are diagrams illustrating another configuration example of a subframe.
Figure 20B:
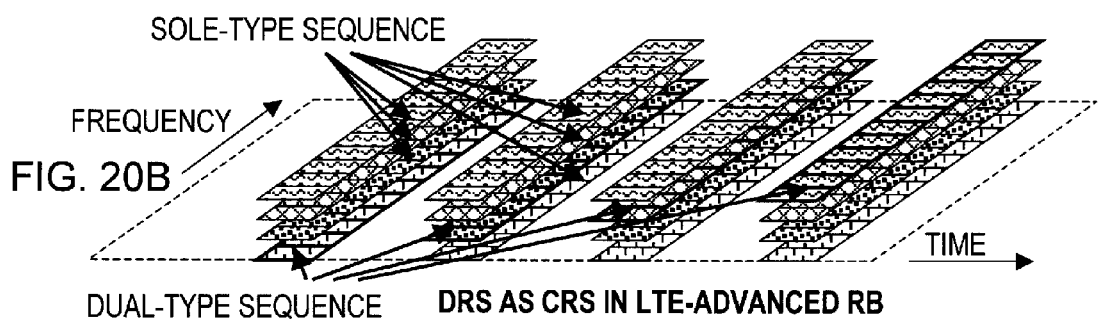
Figure 20C:
FIG. 20C is an explanatory diagram.

Also, DRS can fulfill the role of CRS. FIG. 20A to FIG. 20C illustrate examples of such a feature. FIG. 20A illustrates an example of resource allocation of CRS transmitted from transmission antennas 170-4 to 170-7. FIG. 20B is a diagram illustrating an example in which four overlapping DRS are allocated at a same region as that of a resource element to which the above CRS are allocated. As illustrated in FIG. 20B, a DRS (RS Ant4) transmitted by transmission antenna 170-4 is allocated to the same region as that of the CRS transmitted by the same antenna. For instance, the terminal 300 performs a channel quality measurement using for instance the DRS transmitted by transmission antenna 170-4, from among the DRS, as the CRS transmitted by the same antenna, CQI feedback information or the like may also be used.

In the present embodiment, such DRS that double as CRS are referred to as "Dual-Type DRS", and other DRS are referred to as "Sole-Type DRS".

Examples of code sequences of the CRS and DRS transmitted by the transmission antennas 170-4 to 170-7 are explained next.

FIG. 21A to FIG. 21D are examples of code sequences of the DRS or CRS transmitted respectively by transmission antennas 170-4 to 170-7. In the example of FIG. 5A, for instance, 12 resource elements are allocated to each CRS. The code sequence of the CRS transmitted by transmission antenna 170-4 can be denoted as (+1, +1, +1, +1, +1, +1, +1, +1, +1, +1, +1, +1) (Sequence-0). Herein, such code sequences exhibit mutual correlation in that upon multiplication of each code in the code sequence by those of other code sequences (Sequence-1 to Sequence-3), and addition of the results, the resulting addition values are all "0". Such code sequences are called "Walsh codes".

Likewise, using such a code sequence for CRS allows the terminals 200, 300 to decode the CRS in an easy manner, while suppressing interference from data at overlapping resource element regions. Using such a code sequence for DRS allows the terminal 300 to decode DRS in an easy manner.

The terminals 200, 300 estimate CRS and DRS having such code sequences. Thereupon, for instance, the CRS estimating unit 213, the DRS estimating unit 3130 and the CRS estimating unit 3131 perform channel estimation and so forth using the CRS and the DRS. Herein, the CRS estimating unit 213 and so forth can perform channel estimation using for instance four code sequences from among the total 12 code sequences, and can output three estimation results. The overall result of execution of one-time channel estimation using all the 12 code sequences is averaged. However, local changes can be detected, for instance, by using three estimation results.

FIG. 21E to FIG. 21H are diagram illustrating examples of other code sequences used in CRS and DRS. These code sequences are called "Barker Sequences", such that each code sequence (Sequence-0 to Sequence-3) exhibits mutual correlation, in the same way as the "Walsh code". Using such a code sequences allows the terminals 200, 300 to easily decode the CRS or DRS while suppressing interference from data.

Power control for CRS and DRS is explained next. The CRS transmitted from transmission antennas 170-4 to 170-7 are allocated to resource elements overlapping with data at a data region (PDSCH) at which data is transmitted (FIG. 5A to FIG. 10D). The magnitude of the transmission power of data and so forth transmitted from respective transmission antennas 170-4 to 170-7 is established beforehand. Upon transmission of the CRS, therefore, the base station 100 sets the data transmission power to be greater than the transmission power of the CRS, in such a manner that the combined transmission power of the data and the CRS is a pre-established transmission power. The base station 100 can transmit the data and CRS, at respective transmission powers, simultaneously and at the same frequency.

Figures 22A, 22B:
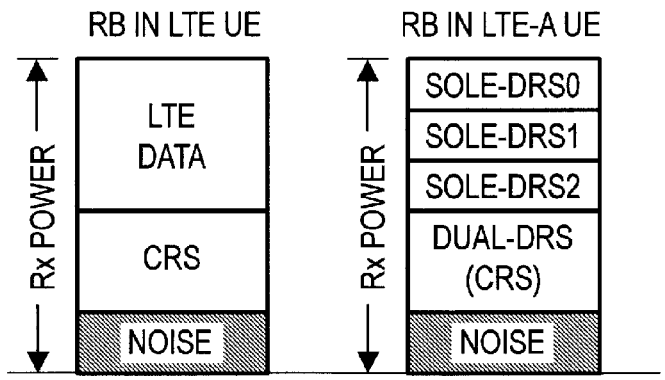
FIG. 22A to FIG. 22C are diagrams illustrating examples of transmission power.

FIG. 22A and FIG. 22B are diagrams illustrating examples of power control. FIG. 22A is a diagram illustrating an example in which data and CRS are transmitted, at respective transmission powers, with anticipated noise factored in. The example of FIG. 22B is an example of DRS transmission. In the case of DRS, respective DRS are overlappingly allocated to a same resource element. Therefore, respective transmission powers are decided in such a manner that "Dual-Type DRS" have a greater transmission power than "Sole-Type DRS", and so that, overall, the transmission power is the upper limit of power transmitted by respective transmission antennas 170-4 to 170-7. As illustrated in FIG. 22B the respective transmission powers may be decided with noise factored in.

The transmission power of "Dual-Type DRS" may be identical to that of "Sole-Type DRS", or may be a dissimilar transmission power. The "Dual-Type DRS" may have the same transmission power as CRS, as illustrated in FIG. 22A and FIG. 22B.

For instance, the second CRS generation unit 1142 of the base station 100 may perform the above-described power control by imparting weighting to the data or CRS outputted by the first CRS generation unit 1141 or the first modulating unit 112, and outputting the result. Regarding the DRS, weighting may be imparted to each DRS that is outputted by the DRS generation unit 1242.

Figure 22C:
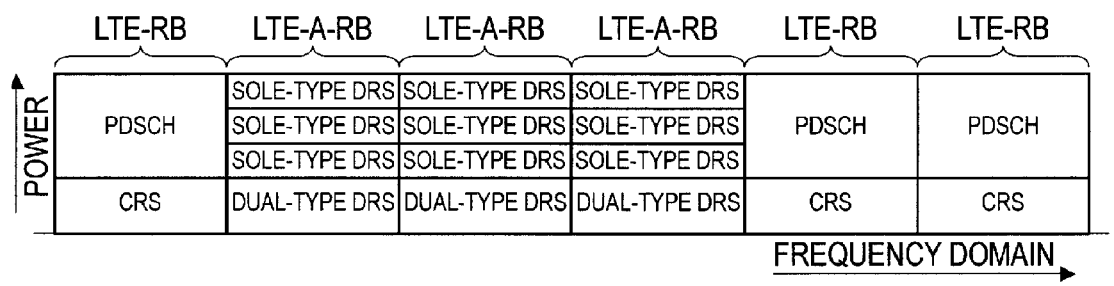

FIG. 22C is a diagram illustrating an example of transmission power of resource elements that include CRS transmitted from transmission antennas 170-4 to 170-7, and transmission power of resource elements that include DRS, for each subframe. As described above, some overlapping DRS may be used as CRS. In this case, the transmission power of such "Dual-Type DRS" must be identical to the transmission power of CRS transmitted by transmission antennas 170-4 to 170-7. The DRS estimating unit 3130 of the terminal 300 holds information on transmission power of CRS (or "Dual-Type DRS"), whereby DRS that are used as "Dual-Type DRS", from among a plurality of DRS, can be easily estimated.

Figure 23:
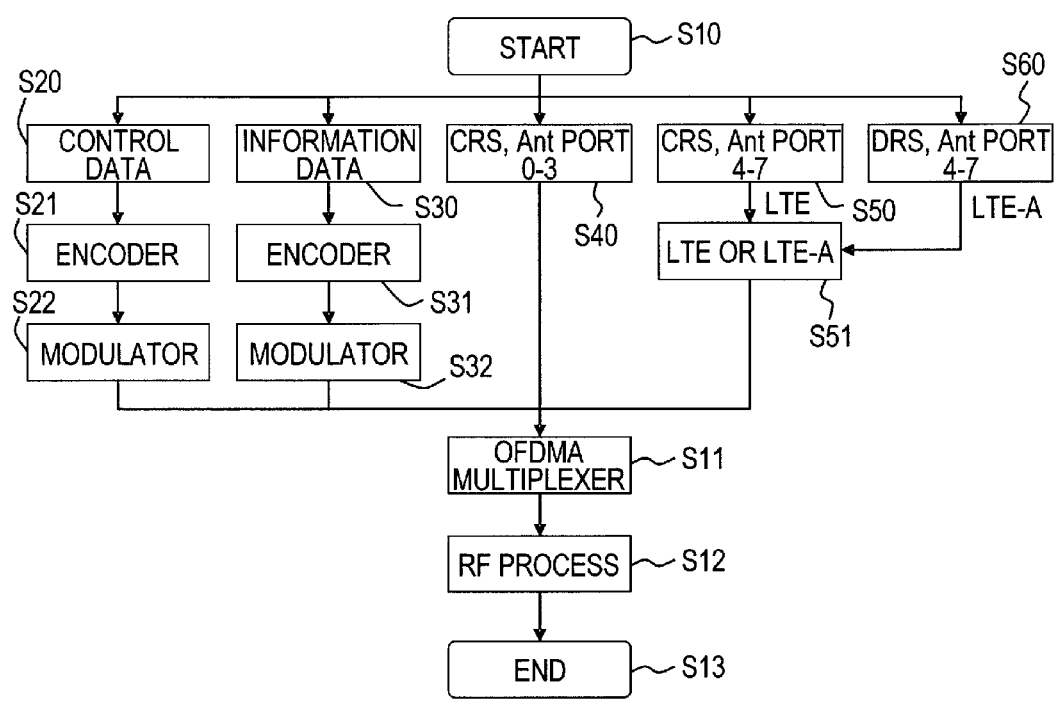
FIG. 23 is a flowchart illustrating an operation example of a base station apparatus.
Figure 24A:
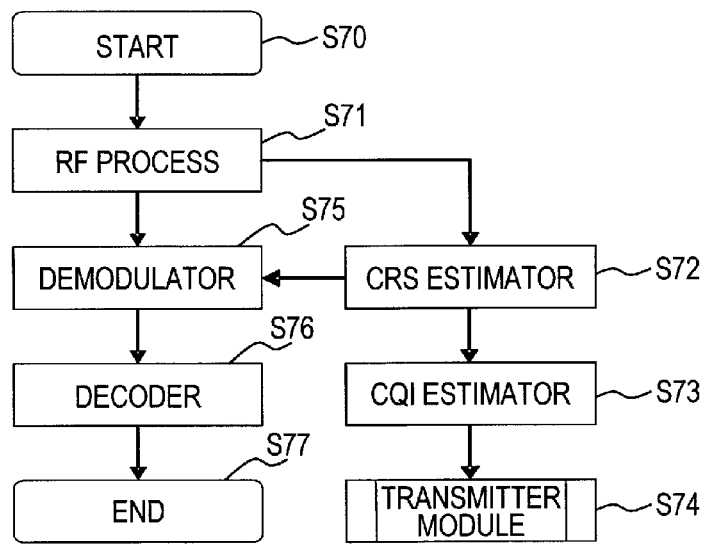
FIG. 24A is a flowchart illustrating an operation example of a terminal.
Figure 24B:
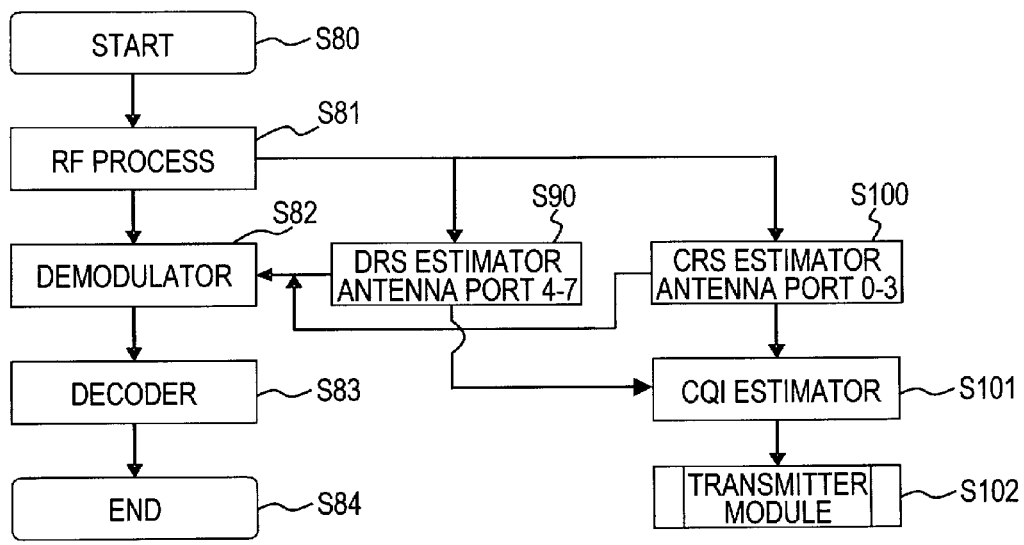
FIG. 24B is a flowchart illustrating an operation example of another terminal.
Figure 25:
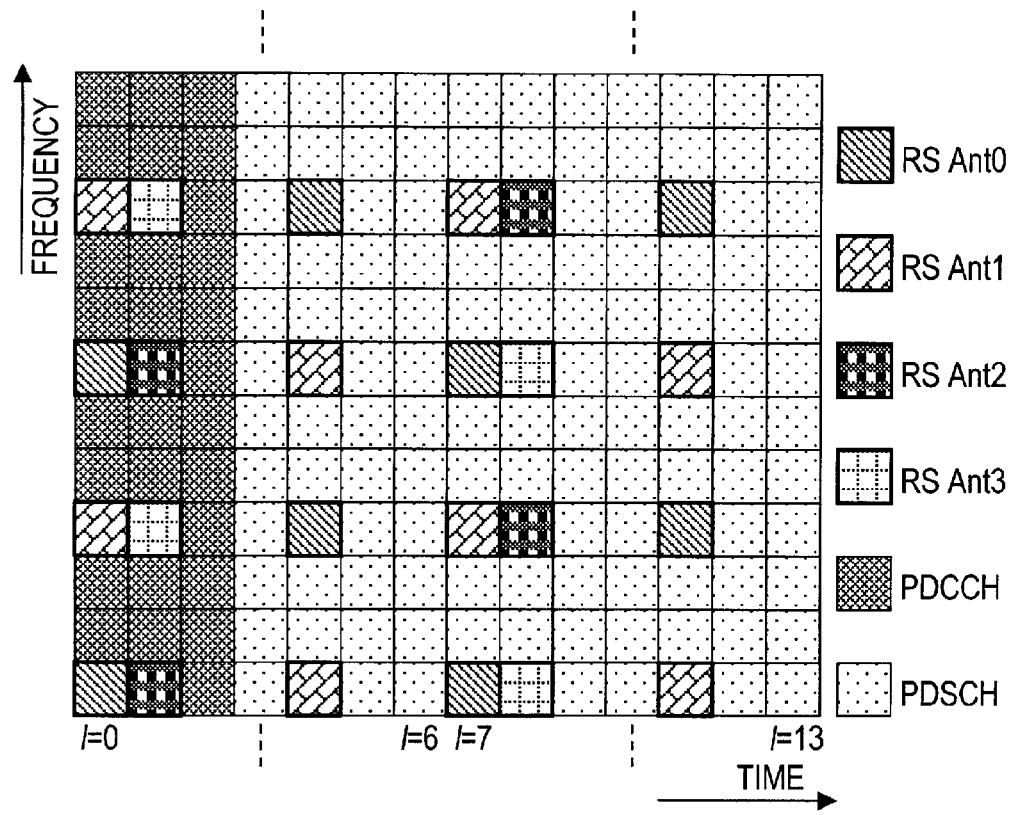
FIG. 25 is a diagram illustrating another configuration example of a subframe.
Figure 26:
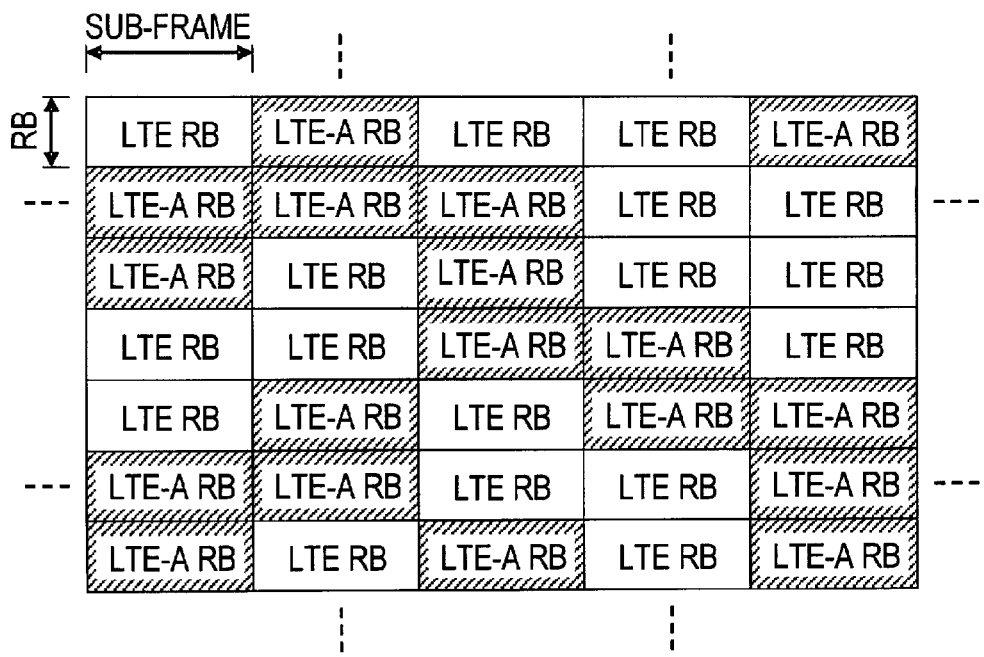
FIG. 26 is a diagram illustrating an example of resource allocation.

The operation of the foregoing is explained next. FIG. 23 is a diagram illustrating an operation example of the base station 100; FIG. 24A is a diagram illustrating an operation example of the terminal 200, and FIG. 24B an operation example of the terminal 300.

The base station 100 initiates the process (S10), whereupon the control signal generation unit 130 generates a control signal (S20). Next, the third encoding unit 131 encodes the control signal (S21), and the third encoding unit 131 modulates the encoded control signal, and outputs the result to the multiplexing unit 150 (S22).

The data is outputted to the first and the second encoding units 111, 121 (S30). The first and second encoding units 111, 121 encode the data (S31). Next, the first and second modulating units 112, 122 modulate the respective encoded data, and output the result to the multiplexing unit 150 (S32).

The first and third CRS generation units 1141 generate CRS to be transmitted by transmission antennas 170-0 to 170-3, and output the respective CRS to the multiplexing unit 150 (S40).

The second CRS generation unit 1142 generates CRS to be transmitted by transmission antennas 170-4 to 170-7, and output the respective CRS to the multiplexing unit 150 (S50). At this time, the second CRS generation unit 1142 outputs the CRS after imparting weighting in such a manner that transmission power is lower with respect to data at overlapping regions.

The DRS generation unit 1242 generates DRS to be transmitted by transmission antennas 170-4 to 170-7, and outputs the DRS to the multiplexing unit 150 (S60). For instance, the DRS generation unit 1242 imparts weighting to each DRS, in such a manner that transmission power of DRS other than "Dual-Type DRS" is smaller than a "Dual-Type DRS", and outputs the result.

Once the processes of S50 and S60 are over, the multiplexing unit 150 allocates the CRS from the second CRS generation unit 1142 to the LTE compliant terminal 200, and the DRS from the DRS generation unit 1242 to the LTE-A compliant terminal 300 (S51).

Once the processes of S22, S32 and S51 are over, the multiplexing unit 150 multiplexes data, CRS and DRS, and the data and so forth are mapped to frequency regions and time regions on the basis of the first and second scheduling information from the scheduler 140 (for instance, as in FIG. 5A to FIG. 5C, and FIG. 11A to FIG. 11C) (S11).

Next, RF units 160-0 to 160-7 convert the output from the multiplexing unit 150 into radio signal (S12), and respective transmission antennas 170-0 to 170-7 transmit the radio signal, as transmission signal, to the respective terminals 200, 300. The series of processes is completed thereby (S13).

The LTE compliant terminal 200 initiates the present process (S70), whereupon the RF unit 211 of the terminal 200 converts the transmission signal received by the antenna 210 into the signal at a time before RF conversion at the base station 100 (S71).

Next, the CRS estimating unit 213 estimates the CRS for the output from the RF unit 211 (S72). The CRS estimating unit 213 may estimate the CRS that is transmitted from all transmission antennas 170-0 to 170-7 of the base station 100, or may estimate the CRS that is transmitted from transmission antennas 170-0 to 170-3. The CRS estimating unit 213 estimates CRS based on first scheduling information held in the own CRS estimating unit 213.

Next, the CRS estimating unit 213 performs coherent detection on the basis of the estimated CRS, outputs the detection result to the demodulating unit 212, performs channel estimation on the basis of the estimated CRS, and feeds back the estimation result, for instance, in the form of CQI, to the base station 100 (S73 to S74).

The demodulating unit 212 demodulates data on the basis of the detection result from the CRS estimating unit 213 (S75). The decoding unit 214 decodes the demodulated data (S76). The series of processes is completed thereby (S77).

The LTE-A compliant terminal 300 initiates the present process (S80). Thereupon, the RF unit 311 of the terminal 300 converts the reception signal received by the antenna 310 into the signal at a time before RF conversion at the base station 100 (S81).

The DRS estimating unit 3130 estimates the DRS that is transmitted by transmission antennas 170-4 to 170-7 of the base station 100 (S90). The DRS estimating unit 3130 estimates the DRS on the basis of, for instance, second scheduling information held in the own DRS estimating unit 3130. The DRS estimating unit 3130 performs, for instance, channel estimation and coherent detection on the basis of the estimated DRS, and feeds back the channel estimation results, in the form of CQI, to the base station 100 (S101 to S102). The DRS estimating unit 3130 outputs the coherent detection result to the demodulating unit 312.

The CRS estimating unit 3131 estimates the CRS that is transmitted by transmission antennas 170-0 to 170-3 of the base station 100 (S100). For instance, the CRS estimating unit 3131 estimates the CRS on the basis of second scheduling information held in the CRS estimating unit 3131. The CRS estimating unit 3131 performs channel estimation on the basis of the CRS, and feeds back the channel estimation results, in the form of CQI, to the base station 100 (S101 to S102). The CRS estimating unit 3131 performs coherent detection on the basis of the CRS, and outputs the detection result to the demodulating unit 312.

Once the processes of S81, S90 and S100 are over, the demodulating unit 312 demodulates data on the basis of the estimation results of the DRS estimating unit 3130 or the CRS estimating unit 3131 (S82).

Next, the decoding unit 314 decodes the demodulated data (S83). The series of processes is completed thereby (S84).

Other Embodiments

Other embodiments are explained next.

The base station 100 may perform precoding, in which data series are mapped to respective transmission antennas 170-0 to 170-7, upon transmission of data and so forth from the plurality of transmission antennas 170-0 to 170-7. The present embodiment can also be carried out in a case where precoding is performed by the base station 100. In a case where CRS for respective transmission antennas 170-0 to 170-7 are allocated as resource elements and, through precoding, the CRS are not actually transmitted from allocated respective transmission antennas 170-0 to 170-7, then the base station 100 and the terminals 200, 300 hold, for instance, determinants for performing precoding, so that the respective CRS can be estimated by performing a processes relating to precoding, using the same determinants. The precoding process may be carried out, for instance, by the multiplexing unit 150 of the base station 100, the CRS estimating unit 213 or the demodulating unit 212 of the terminal 200, or the RS estimating unit 313 or the demodulating unit 312 of the terminal 300. The terminals 200, 300 may transmit feedback information (for instance, CQI); such that, for instance the multiplexing unit 150 of the base station 100 performs a precoding process on the basis of the feedback information.

In the examples explained above, the base station 100 has eight transmission antennas, but may have five or more transmission antennas. For instance, when the number of transmission antennas is five, the CRS transmitted from transmission antenna 170-4 may be allocated to any one from among the four CRS sequences illustrated in FIG. 5A. For DRS as well, there may be used any one DRS sequence from among the overlapping DRS sequences illustrated in FIG. 11A. In this case, the DRS are allocated to the same region as that of any one of those illustrated in FIG. 5A, in order for the DRS to function as CRS. When the number of transmission antennas is nine or more, other resource elements are allocated to the CRS transmitted from the 9-th, 10-th, . . . transmission antennas. The number of overlapping DRS may be modified in accordance with the number of transmission antennas.

In the above-described examples, the resource elements of the CRS transmitted by transmission antennas 170-4 to 170-7 are allocated across the entire frequency band of each subframe (see FIG. 5A). The number of resource elements of CRS transmitted from respective transmission antennas 170-4 to 170-7 may be one, instead of 12. In the above-described examples, such CRS are allocated to a plurality of resource elements, as a result of which it becomes easier for the CRS estimating unit 213 and so forth to estimate the CRS by aggregating CRS that have small transmission power. However, data can be allocated to more resource elements, so that the resources can be used effectively, by setting the resource element number to one.

The number of resource elements of DRS transmitted by respective transmission antennas 170-4 to 170-7 may be one, instead of a plurality of thereof, for instance 12. Resources can be used effectively herein as well.

In the above-described examples, a resource is allocated to a data channel region (PDSCH) of the subframe, for each CRS transmitted by transmission antennas 170-4 to 170-7 (for instance, FIG. 5A to FIG. 5C). For instance, the CRS may be allocated to the control channel region (PDCCH). Likewise, each DRS transmitted from transmission antennas 170-4 to 170-7 may be allocated to the control channel region.

In the examples explained above, the scheduling information is held beforehand by the base station 100 and the terminals 200, 300. For instance, the base station 100 and so forth may hold the subframe illustrated in FIG. 5A to FIG. 5C, the subframe illustrated in FIG. 6A to FIG. 6C and the subframe illustrated in FIG. 7A to FIG. 7C, and switching may be performed on the basis of, for instance, feedback information (for instance, CQI) from the terminals 200, 300. The same applies to DRS. This can be easily implemented by, for instance, giving an identification code beforehand to each subframe, and including the identification code in the feedback information from the terminals 200, 300.

In the examples explained above, the scheduling information of the terminals 200, 300 is stored in the CRS estimating unit 213 and so forth, but may be stored in a memory provided separately.

There can be provided a radio communication system, a base station apparatus, a terminal apparatus, and a radio communication method in a radio communication system, in which reference signals can be transmitted from five or more transmission antennas. Also, a radio communication system or the like can be provided in which resources are used effectively.

One example of a hardware constitution of the base station in the above embodiment is explained hereinafter. Each function of the base station in the above embodiment is performed by part or all of following hardware component. The base station in the above embodiment includes a radio IF (InterFace), a processor, a memory, a logic circuit, a wireline IF, and so on. The radio IF is a interface device performing radio communication with the terminal. The processor is a device processing data, and includes a CPU (Central Processing Unit), a DSP (Digital Signal Processor), or the like, for example. The memory is a device storing data, and includes a ROM (Read Only Memory), a RAM (Random Access Memory), or the like, for example. The logic circuit is an electric circuit performing logic operation, and includes a LSI (Large Scale Integration), a FPGA (Filed-Programming Gate Array), an ASIC (Application Specific Integrated Circuit), or the like, for example. The wireline IF is an interface device performing wired communication with an other base station and so on, connected to a network of a mobile phone system.

One example of a hardware constitution of the terminal in the above embodiment is explained hereinafter. Each function of the terminal in the above embodiment is performed by part or all of following hardware component. The terminal in the above embodiment includes a radio IF (InterFace), a processor, a memory, a logic circuit, an input interface, an output interface, and so on. The processor is a device processing data, and includes a CPU (Central Processing Unit), a DSP (Digital Signal Processing), or the like, for example. The memory is a device storing data, and includes a ROM (Read Only Memory), a RAM (Random Access Memory), or the like, for example. The logic circuit is an electric circuit performing logic operation, and includes a LSI (Large Scale Integration), a FPGA (Filed-Programming Gate Array), an ASIC (Application Specific Integrated Circuit), or the like, for example. The input IF is a device performing input, and includes an operation button, a microphone, or the like, for example. The output IF is a device performing output, and includes a display, a speaker, or the like, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication system comprising:
 a base station apparatus; and a terminal apparatus, wherein the radio communication system performs radio communication between the base station apparatus and terminal apparatus,
 the base station apparatus including:
 a first antenna, a second antenna, and a third antenna; and
 a processor configured for
  holding first scheduling information including a data channel region, a control channel region, and a first and a second region, a resource of a common reference signal transmitted from the first antenna being allocated to the first region, the first region not overlapping the data channel region and control channel region, a resource of the common reference signal transmitted from the second antenna being allocated to the second region, the second region overlapping the data channel region or the control channel region and not overlapping the first region,
  holding second scheduling information including a third region to which a resource of a dedicated reference signal transmitted from the second antenna is allocated and a fourth region to which a resource of the dedicated reference signal transmitted from the third antenna is allocated, the third and fourth regions not overlapping the first region, the third and fourth regions overlapping with a fifth and sixth region respectively to which data is not allocated in the data channel region or a control signal is not allocated in the control channel region, the third region overlapping the fourth region; and transmitting the common reference signal, and the dedicated reference signal, based on the first or second scheduling information, the terminal apparatus including:
a radio communication interface configured for receiving the common reference signal or the dedicated reference signal, based on the first or the second scheduling information, and the processor is configured for transmitting the data or the control signal of a region overlapping with the common reference signal at a higher transmission power than the common reference signal.

2. The radio communication system according to claim 1, wherein
the base station apparatus includes five or more transmission antennas, the first antenna corresponds to any one of a fifth and subsequent transmission antennas, and the second antenna corresponds to any one of an m-th antenna (m being an integer that satisfies 1≤m<5).

3. The radio communication system according to claim 2, wherein each of the resources of the common reference signal transmitted from an n-th (n being an integer equal to or greater than 5) and subsequent transmission antenna is allocated to a same time region and across a plurality of frequency regions, in the first scheduling information.

4. The radio communication system according to claim 2, wherein each of the resources of the common reference signal transmitted from an n-th (n being an integer equal to or greater than 5) and subsequent transmission antenna is allocated to a same frequency region and across a plurality of time regions, in the first scheduling information.

5. The radio communication system according to claim 2, wherein each of the resources of the common reference signal transmitted from an n-th (n being an integer equal to or greater than 5) and subsequent transmission antenna is allocated to mutually dissimilar frequency regions and to mutually dissimilar time regions, in the first scheduling information.

6. The radio communication system according to claim 2, wherein one or more resources are allocated out of each resources of the common reference signal transmitted from each of the fifth and subsequent transmission antennas in the first scheduling information.

7. The radio communication system according to claim 2, wherein the processor is configured for holding as the first scheduling information a plurality of scheduling information in which one or more mutually different resources are allocated out of each resources of the common reference signal transmitted from each of the fifth and subsequent transmission antennas, the processor configured for switching a plurality of scheduling information respectively, and the processor is configured for transmitting_the data and the control signal based on each of the scheduling information switched by the switching.

8. The radio communication system according to claim 2, wherein each of the resources of the dedicated reference signal transmitted from an n-th (n being an integer equal to or greater than 5) and subsequent transmission antenna is allocated to a same time region and across a plurality of frequency regions, in the second scheduling information.

9. The radio communication system according to claim 2, wherein each of the resources of the dedicated reference signal transmitted from an n-th (n being an integer equal to or greater than 5) and subsequent transmission antenna is are allocated to a same frequency region and across a plurality of time regions, in the second scheduling information.

10. The radio communication system according to claim 2, wherein the resources of the dedicated reference signal transmitted from an n-th (n being an integer equal to or greater than 5) and subsequent transmission antenna is allocated to mutually different frequency regions and to mutually different time regions, in the second scheduling information.

11. The radio communication system according to claim 2, wherein at least one resource is allocated out of plurality of the resources of the dedicated reference signal transmitted from each of the fifth and subsequent transmission antennas, in the second scheduling information.

12. The radio communication system according to claim 2, wherein processor is configured for holding as the second scheduling information a plurality of scheduling information in which one or more mutually different resources are respectively allocated out of plurality of the resources of the dedicated reference signal transmitted from each of the fifth and subsequent transmission antennas, the processor configured for switching the plurality of scheduling information respectively, and the processor is configured for transmitting the data and the control signal based on each of the scheduling information switched by the switching.

13. The radio communication system according to claim 2, wherein the radio communication interface is configured for receiving as the common reference signal transmitted from each of the fifth and subsequent transmission antennas, part of the dedicated reference signal transmitted from the fifth and subsequent transmission antennas and received based on the second scheduling information.

14. The radio communication system according to claim 13, wherein the processor is configured for transmitting the dedicated reference signal at a transmission power identical to that of the common reference signal.

15. The radio communication system according to claim 2, wherein the processor is configured for transmitting a code of each common reference or each dedicated reference signal transmitted from each of the fifth and subsequent transmission antennas, as a Walsh Code.

16. The radio communication system according to claim 2, wherein the processor is configured for transmitting a code of each common reference signal or each dedicated reference signal transmitted from each of the fifth and subsequent transmission antennas, as a Barker Code.

17. The radio communication system according to claim 2, wherein the radio communication interface is configured for performing channel estimation of a communication channel between the base station apparatus and the terminal apparatus by using a partial code sequence out of each common reference signal or the each dedicated reference signal transmitted from each of the fifth and subsequent transmission antennas and received as a Walsh Code.

18. The radio communication system according to claim 2, wherein the processor is configured for performing a precoding process to perform mapping to each transmission antenna, on the data, the control signal, and the common reference signal or the dedicated reference signal.

19. The radio communication system according to claim 1, wherein the processor is configured for transmitting the common reference signal in accordance with a predetermined code.

20. A base station apparatus for performing radio communication with a terminal apparatus, comprising:
a first antenna, a second antenna, and a third antenna; and
a processor configured for
holding first scheduling information including a data channel region, a control channel region, and a first and a second region, a resource of a common reference signal transmitted from the first antenna being allocated to the first region, the first region not overlapping the data channel region and control channel region, a resource of the common reference signal transmitted from the second antenna being allocated to the second region, the second region overlapping with the data channel region or the control channel region and not overlapping the first region, and holding second scheduling information including a third region to which a resource of a dedicated reference signal transmitted from the second antenna is allocated and a fourth region to which a resource of the dedicated reference signal transmitted from the third antenna is allocated, the third and fourth regions not overlapping the first region, the third and fourth regions overlapping with a fifth and sixth region respectively to which data is not allocated in the data channel region or a control signal is not allocated in the control channel region, the third region overlapping the fourth region; and transmitting the common reference signal, and the dedicated reference signal, based on the first or second scheduling information, wherein the processor is configured for transmitting the common reference signal in accordance with a predefined code, and the processor is configured for transmitting the data or the control signal of a region overlapping with the common reference signal at a higher transmission power than the common reference signal.

21. A terminal apparatus for performing radio communication with a base station apparatus including a first, a second and a third antenna, comprising:

a processor configured for holding first scheduling information including a data channel region, a control channel region, and a first and a second region, a resource of a common reference signal transmitted from the first antenna of the base station apparatus being allocated to the first region, the first region not overlapping the data channel region and control channel region, a resource of the common reference signal transmitted from the second antenna of the base station apparatus being allocated to the second region, the second region overlapping the data channel region or the control channel region and not overlapping the first region, and holding second scheduling information including a third region to which a resource of a dedicated reference signal transmitted from the second antenna is allocated and a fourth region to which a resource of the dedicated reference signal transmitted from the third antenna is allocated, the third and fourth regions not overlapping the first region, the third and fourth regions overlapping with a fifth and sixth region respectively to which data is not allocated in the data channel region or a control signal is not allocated in the control channel region, the third region overlapping the fourth region; and a radio communication interface configured for receiving the common reference signal or the dedicated reference signal, based on the first or second scheduling information, wherein the radio communication interface is configured for receiving the common reference signal transmitted in accordance with a predefined code, and the radio communication interface is configured for receiving the data or the control signal of a region overlapping with the common reference signal, transmitted at a higher transmission power than the common reference signal.

22. A radio communication method in a radio communication system for performing radio communication between a base station apparatus and a terminal apparatus, the method comprising:

transmitting a dedicated reference signal, and a common reference signal, based on first or second scheduling information held in a scheduling information holding unit of the base station apparatus, by the base station including a first antenna, a second antenna, and a third antenna; and receiving the common reference signal or the dedicated reference signal, based on the first or the second scheduling information, by the terminal apparatus, wherein the first scheduling information includes a data channel region, a control channel region, and a first and a second region, a resource of a common reference signal transmitted from the first antenna being allocated to the first region, the first region not overlapping the data channel region and control channel region, a resource of the common reference signal transmitted from the second antenna being allocated to the second region, the second region overlapping the data channel region or the control channel region and not overlapping the first region, the second scheduling information includes a third region to which a resource of a dedicated reference signal transmitted from the second antenna is allocated and a fourth region to which a resource of the dedicated reference signal transmitted from the third antenna is allocated, the third and fourth regions not overlapping the first region, the third and fourth regions overlapping with a fifth and sixth region respectively to which data is not allocated in the data channel region or a control signal is not allocated in the control channel region, the third region overlapping the fourth region, the base station apparatus transmits the common reference signal in accordance with a predefined code when the base station apparatus transmits the common reference signal, and the dedicated reference signal, and the base station apparatus transmits the data or the control signal of a region overlapping with the common reference signal at a higher transmission power than the common reference signal.

* * * * *